United States Patent
Kitahata et al.

(10) Patent No.: US 7,057,361 B2
(45) Date of Patent: Jun. 6, 2006

(54) INVERTER CONTROL DEVICE AND ELECTRIC VEHICLE THEREOF

(75) Inventors: Takeshi Kitahata, Aichi-ken (JP);
Hisanori Shibata, Mie-ken (JP);
Yoshinobu Nakamura, Mie-ken (JP);
Motoyasu Mochizuki, Aichi-ken (JP);
Yosuke Nakazawa, Tokyo (JP);
Yoshinori Sugimoto, Saitama-ken (JP);
Hiroaki Nakashima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/452,930

(22) Filed: Jun. 3, 2003

(65) Prior Publication Data
US 2004/0008530 A1   Jan. 15, 2004

(30) Foreign Application Priority Data
Jun. 5, 2002   (JP)   ............... 2002-164201

(51) Int. Cl.
*H02P 5/00* (2006.01)
(52) U.S. Cl. ............... 318/139; 318/440; 320/138
(58) Field of Classification Search ............... 318/139, 318/440, 34, 599, 606, 801, 299; 320/138
See application file for complete search history.

(56) References Cited

U.S. PATENT DOCUMENTS

| | | | | |
|---|---|---|---|---|
| 4,879,639 A | * | 11/1989 | Tsukahara | 363/37 |
| 5,298,848 A | * | 3/1994 | Ueda et al. | 318/811 |
| 5,369,540 A | * | 11/1994 | Konrad et al. | 361/6 |
| 5,446,365 A | * | 8/1995 | Nomura et al. | 320/128 |
| 5,563,479 A | * | 10/1996 | Suzuki | 318/139 |
| 5,592,371 A | * | 1/1997 | Rajashekara et al. | 363/98 |
| 5,619,107 A | * | 4/1997 | Shinohara et al. | 318/139 |
| 5,804,973 A | * | 9/1998 | Shinohara et al. | 324/548 |
| 5,914,582 A | * | 6/1999 | Takamoto et al. | 318/801 |
| 5,952,810 A | * | 9/1999 | Yamada et al. | 318/700 |
| 5,994,789 A | * | 11/1999 | Ochiai | 307/10.1 |
| 6,002,221 A | * | 12/1999 | Ochiai et al. | 318/139 |
| 6,330,804 B1 | * | 12/2001 | Uno et al. | 62/175 |
| 6,377,017 B1 | * | 4/2002 | Kondou et al. | 318/727 |
| 6,630,804 B1 | * | 10/2003 | Moriya et al. | 318/85 |
| 2001/0019251 A1 | * | 9/2001 | Nakazawa | 318/701 |
| 2003/0057913 A1 | * | 3/2003 | Matsushita et al. | 318/727 |

FOREIGN PATENT DOCUMENTS

| JP | 9-70196 A | 3/1997 |
|---|---|---|
| JP | 9-215102 A | 8/1997 |

* cited by examiner

*Primary Examiner*—Rita Leykin
(74) *Attorney, Agent, or Firm*—Foley & Lardner LLP

(57) ABSTRACT

In a discharge control section of an inverter control device, when the connection of the battery and the smoothing capacitor is disconnected by means of a contactor, the charge accumulated on the smoothing capacitor is discharged by applying high-frequency voltage to the stator windings of the motor by controlling the main inverter circuit.

26 Claims, 30 Drawing Sheets

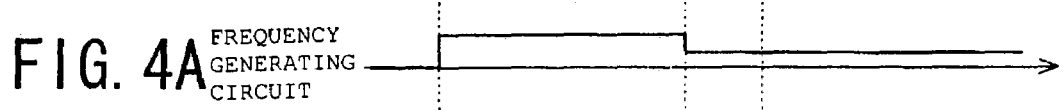
FIG. 4A FREQUENCY GENERATING CIRCUIT
FIG. 4B OSCILLATION CIRCUIT
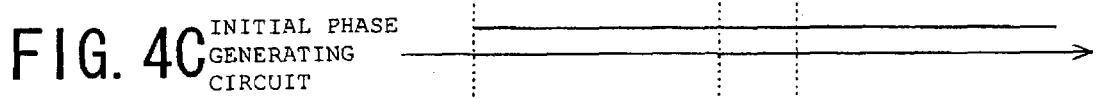
FIG. 4C INITIAL PHASE GENERATING CIRCUIT
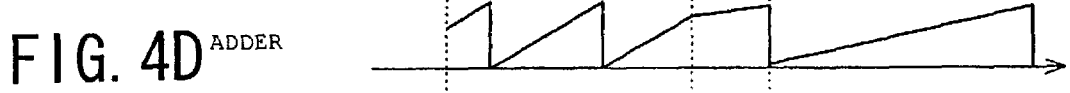
FIG. 4D ADDER
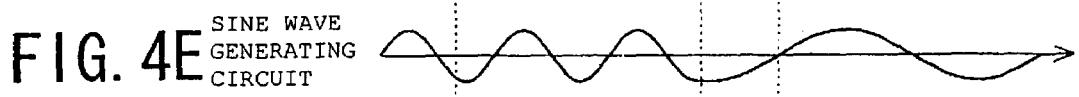
FIG. 4E SINE WAVE GENERATING CIRCUIT
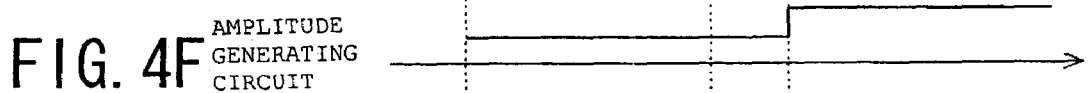
FIG. 4F AMPLITUDE GENERATING CIRCUIT
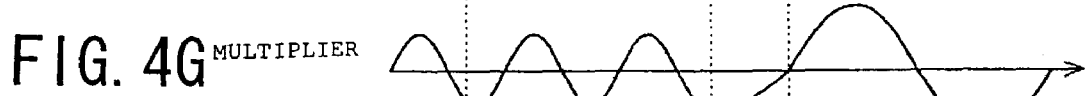
FIG. 4G MULTIPLIER
FIG. 4H PWM CONTROL CIRCUIT U
FIG. 4I PWM CONTROL CIRCUIT X FIG. 8A ADDER 
FIG. 8B d AXIS VOLTAGE GENERATING CIRCUIT 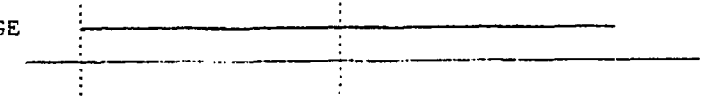
FIG. 8C q AXIS VOLTAGE GENERATING CIRCUIT 
FIG. 8D { Vu, Vv, Vw 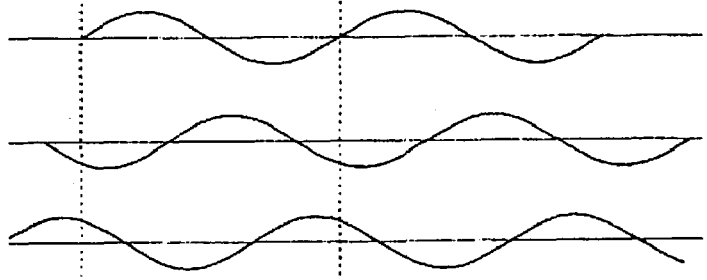
FIG. 8E { u, x, v, y, w, z 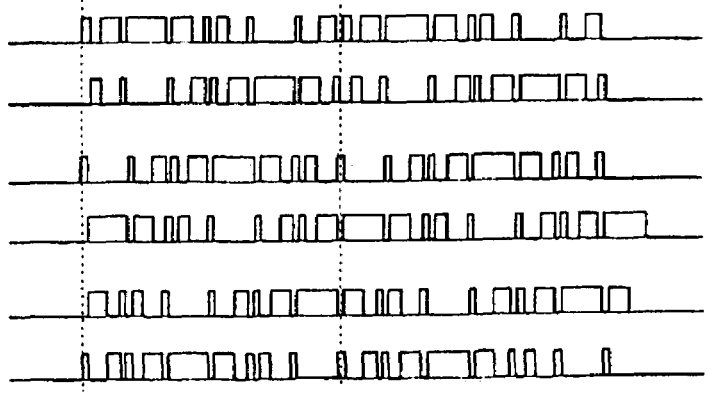

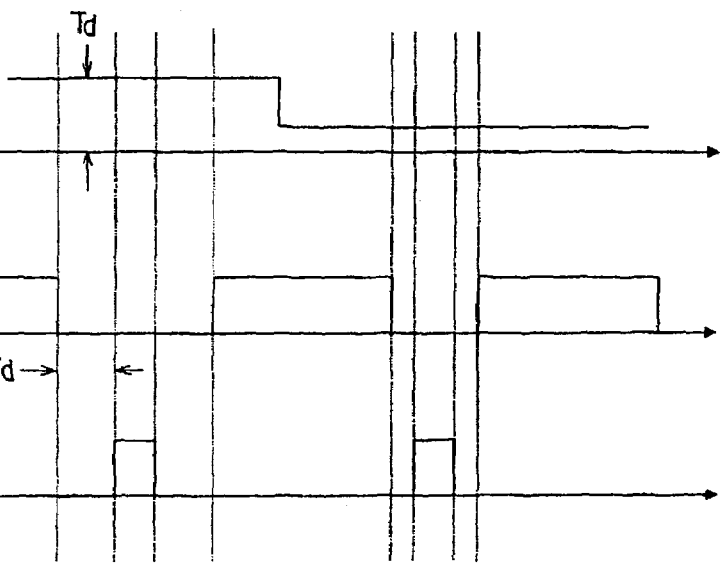
FIG. 33A DEAD TIME SET VALUE GENERATING CIRCUIT
PWM CONTROL CIRCUITS
FIG. 33B u
FIG. 33C x
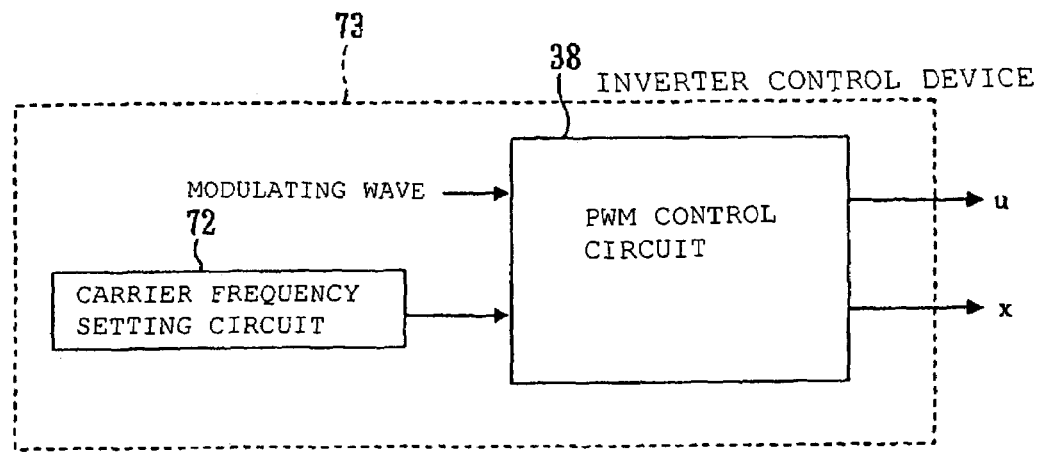
FIG. 34

US 7,057,361 B2

INVERTER CONTROL DEVICE AND ELECTRIC VEHICLE THEREOF

CROSS-REFERENCE TO RELATED APPLICATION

This application claims benefit of priority to Japanese Application No. JP 2002-164201 filed Jun. 5, 2002, the entire content of which is incorporated by reference herein.

BACKGROUND OF THE INVENTION

1. Field of the Invention

The present invention relates to an inverter control device whereby, when the connection between a battery and a smoothing capacitor is disconnected, the charge that has accumulated on the capacitor is discharged and an electric vehicle using this control device.

2. Description of the Related Art

In a construction in which a motor is driven by an inverter using a battery as the power source, when operation of the motor is stopped, the connection with the smoothing capacitor is usually disconnected, in order to minimize battery consumption to the greatest possible extent. However, since, at this time point, charge will have been accumulated on the smoothing capacitor, it is desirable that this accumulated charge should be rapidly discharged.

Discharge of the smoothing capacitor as described above is performed by connecting a discharging resistor to both terminals thereof but this leads to the problem that providing a discharging resistor makes the overall size of the inverter large. As a technique for solving this problem, Laid-open Japanese Patent Publication No. H.9-70196 discloses a construction in which the charge accumulated on the smoothing capacitor is discharged without driving the motor by making the torque current component Iq zero and by making the exciting current component Id a prescribed value, in vector control of the motor that is used for driving the electric vehicle.

With this prior art, if it becomes impossible to obtain an output signal from the rotary position sensor or current sensor, as for example in the event of an accident or malfunction, there is the risk that it may become impossible to perform discharge as desired or, indeed, discharge may become completely impossible.

SUMMARY OF THE INVENTION

Accordingly, one object of the present invention is to provide a novel inverter control device capable of discharging the charge accumulated on the capacitor using an extremely straightforward control system, and an electric vehicle using this control device.

In order to achieve the above object, the present invention is constituted as follows. Specifically, An inverter control device, comprising:

a capacitor smoothing a DC power source voltage that is output from a battery;

a main inverter circuit driving a motor by converting a DC power smoothed by the capacitor into a three-phase AC power;

switching means for opening and closing a connection of said battery and the capacitor; and a control circuit discharging a charge accumulated on the capacitor when the connection between the battery and the capacitor is disconnected by the switching means, by controlling the main inverter circuit to apply a high-frequency voltage to a stator winding of the motor.

Specifically, when the connection of the battery and the capacitor is disconnected by the switching means (device), the operation of the system is stopped, so rotation of the motor also assumes a stopped condition. In this condition, a rotating magnetic field is generated in the stator of the motor when the control circuit applies high-frequency voltage to the stator winding, but the inertia possessed by the stationary rotor acts as a resistive force, so the motor is incapable of rotating in synchronization with this rotating magnetic field. The iron loss (core loss) or copper loss generated by the high-frequency current flowing in the winding can therefore discharge and dissipate the charge accumulated on the capacitor. Also, since this rotating magnetic field is not applied with the object of producing rotation of the motor, it maybe generated with a phase that is completely unrelated to the drive system when the motor is being driven. It may therefore produce discharging of the capacitor without needing to employ sensors or the like to detect the rotary condition of the motor.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4A, FIG. 4B, FIG. 4C, FIG. 4D, FIG. 4E, FIG. 4F, FIG. 4G, FIG. 4H and FIG. 4I are timing charts showing the signal waveform of the various sections;

FIG. 8A, FIG. 8B, FIG. 8C, FIG. 8D and FIG. 8E are timing charts of the discharge control section;

FIG. 33A, FIG. 33B, and FIG. 33C are timing charts showing the dead time;

FIG. 34 is a view corresponding to FIG. 3 showing a twenty-second embodiment of the present invention;

DETAILED DESCRIPTION OF THE INVENTION

Figure 1:
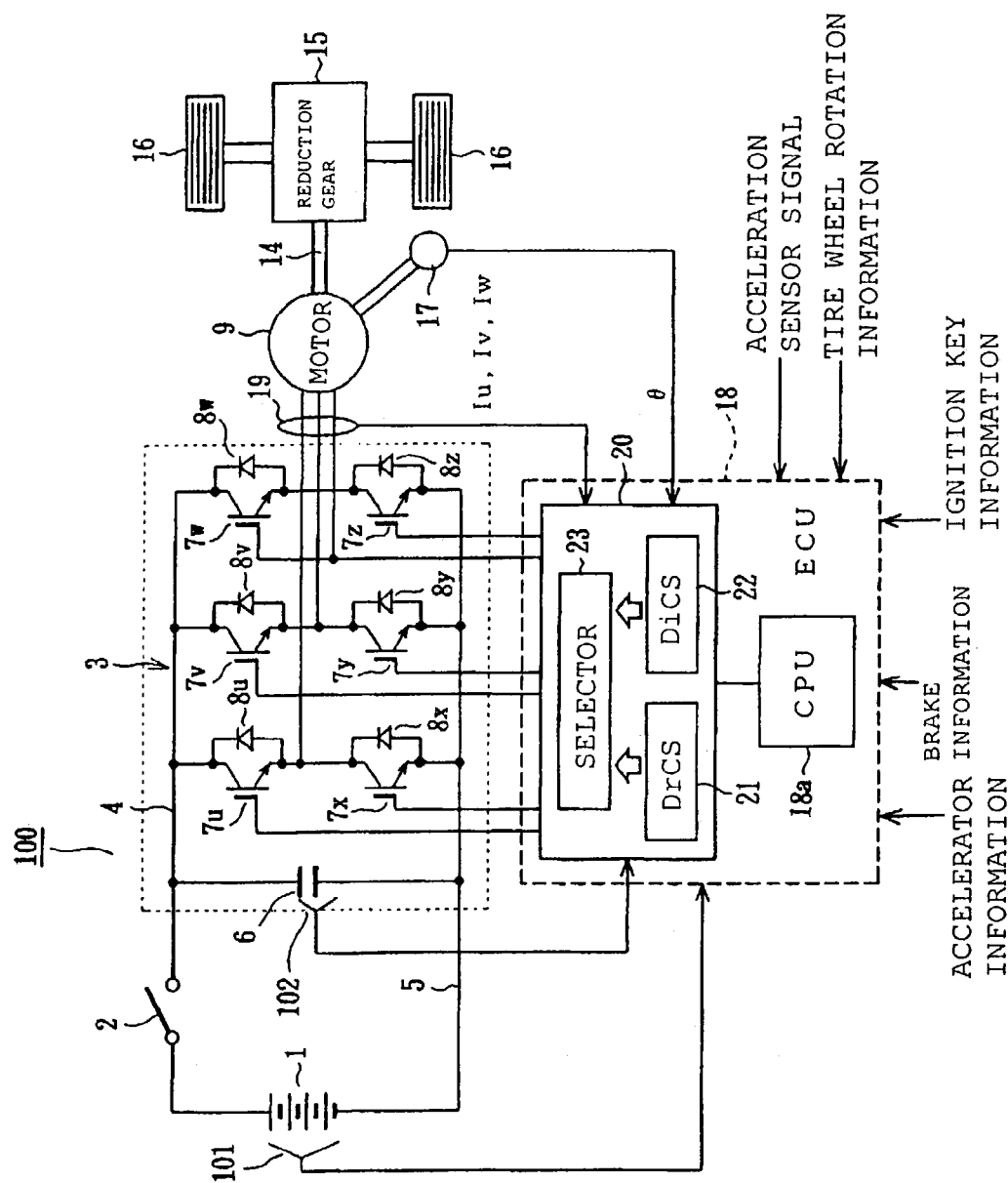
FIG. 1 is a diagrammatic view of the electrical layout of a drive control system of an electric vehicle constituting a first embodiment in which the present invention is applied to an electric vehicle.

Referring now to the drawings, wherein like reference numerals designate identical or corresponding parts throughout the several views, and more particularly to FIGS. 1 to 6 thereof, one embodiment of the present invention will be described.

FIRST EMBODIMENT

FIG. 1 is a view showing diagrammatically the electrical layout relating to the drive control system of an electric vehicle. A battery 1 is constituted to be capable of outputting a DC voltage of the order of 300 V by connecting a plurality of rechargeable battery units (secondary battery units or storage battery units) in series. The positive terminal of this battery 1 is connected to the positive DC bus 4 of a main inverter circuit 3 through a contactor (switching means) 2, while the negative terminal of this battery 1 is connected to the negative DC bus 5 of this main inverter circuit 3.

A smoothing capacitor 6 is connected between the DC buses 4 and 5. The main inverter circuit 3 is constituted by a three-phase bridge connection of six IGBTs (Insulated Gate Bipolar Transistors: switching elements) $7u$, $7v$, $7w$, $7x$, $7y$ and $7z$. Also, flywheel diodes $8u$ to $8z$ are connected in the inverse direction between the collectors and emitters of the IGBTs $7u$ to $7z$. The inverter 100 comprises the contactor 2, main inverter circuit 3 and smoothing capacitor 6.

Figure 5:
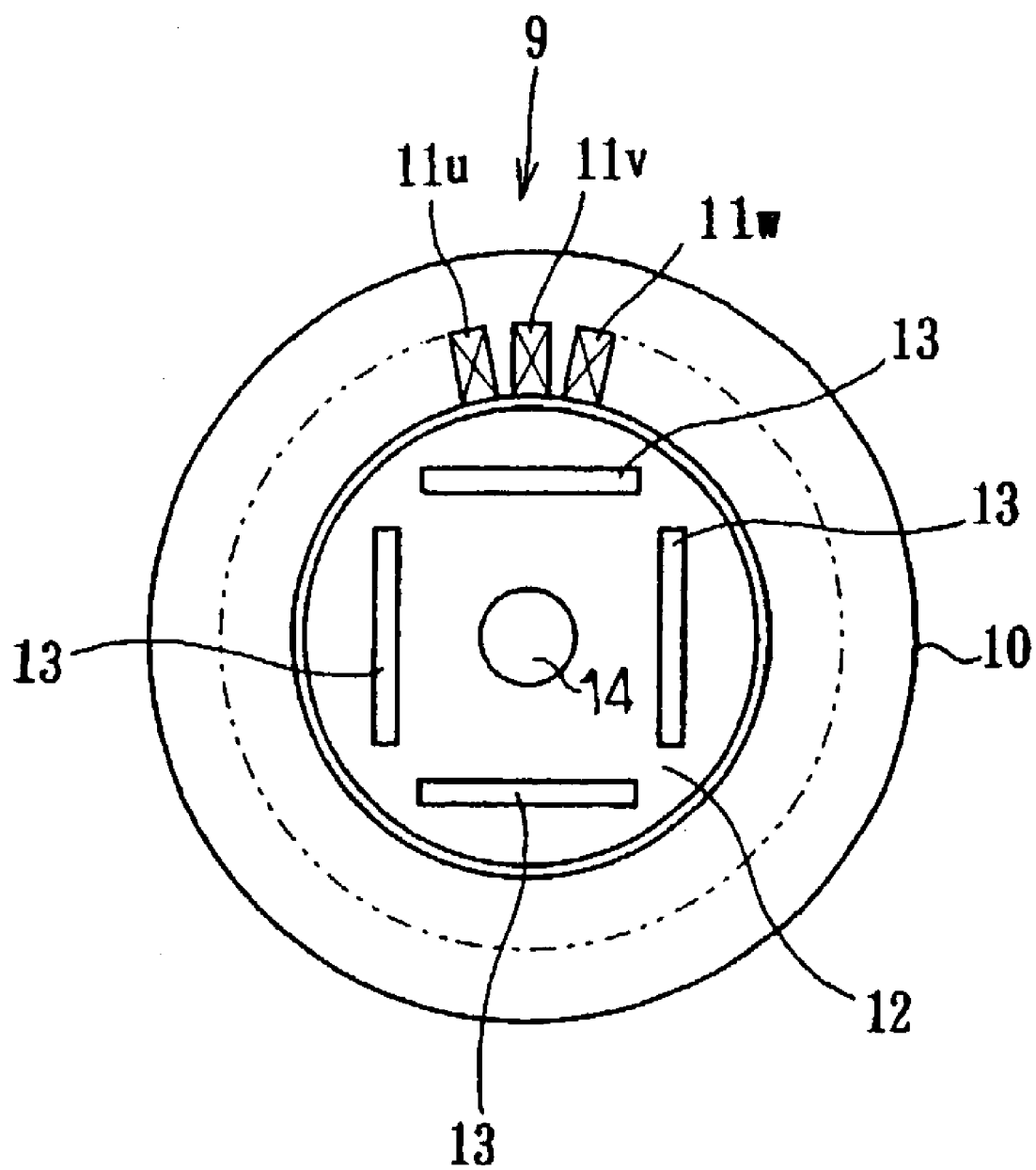
FIG. 5 is a plan view showing the construction of a motor.

The output terminals of the respective phases of the main inverter circuit 3 are respectively connected with the stator windings $11u$, $11v$, $11w$ (see FIG. 5) of each phase, which are wound around the stator core 10 of the motor 9 that is used for driving the electric vehicle. As shown in FIG. 5, the drive motor 9 is constituted as an embedded permanent magnet motor in which permanent magnets 13 are inserted in four slots formed in a rotor core 12.

The rotary shaft 14 of the motor 9 is connected to a reduction gear 15 so that the rotary drive can be transmitted to the wheels 16 of the electric vehicle. Also, the motor 9 is provided with a rotary position sensor 17 comprising a rotary encoder or resolver or the like. The rotary position sensor 17 is arranged to detect the position (phase angle) θ of the rotor of the motor 9 and to output this to the ECU (Electronic Control Unit) 18.

Also, a current sensor 19 (three-phase) comprising a current transformer (so-called CT) or the like is inserted between the main inverter circuit 3 and the motor 9. The current sensor 19 detects the currents Iu, Iv and Iw flowing in the windings $11u$, $11v$ and $11w$ of each phase of the motor 9 and outputs these to the ECU 18. The battery 1 and smoothing capacitor 6 are respectively provided with voltage sensors 101, 102 for detecting their respective terminal voltages.

The ECU 18 comprises a microcomputer whose chief constituent is a CPU $18a$ that is arranged to perform various types of control relating to operation of the electric vehicle. The ECU 18 is supplied with various types of information such as the accelerator information, brake information, ignition key (IG) information and wheel rotation information from the vehicle and is also supplied with a sensor signal that is output by an acceleration sensor, constituting part of the airbag mechanism, not shown.

Also, the ECU 18 incorporates an inverter control device 20. This inverter control device 20 comprises a drive control section (DrCS) 21, discharge control section (control circuit) (DiCS) 22 and selector 23 etc. It should be noted that this control circuit 20 could also be positioned as an auxiliary circuit of the main inverter circuit 3.

The drive control section 21 performs drive control of the motor 9 using the main inverter circuit 3. When, for example, drive of the motor 9 is stopped and the contactor 2 is opened, the discharge control section 22 performs control such as to discharge the charge accumulated on the smoothing capacitor at this time point. Depending on the control condition, the selector 23 selectively outputs one or other of the sets of drive signals u, v, w, x, y, z that are respectively output by the drive control section 21 and discharge control section 22 to the main inverter circuit 3.

Figure 2:
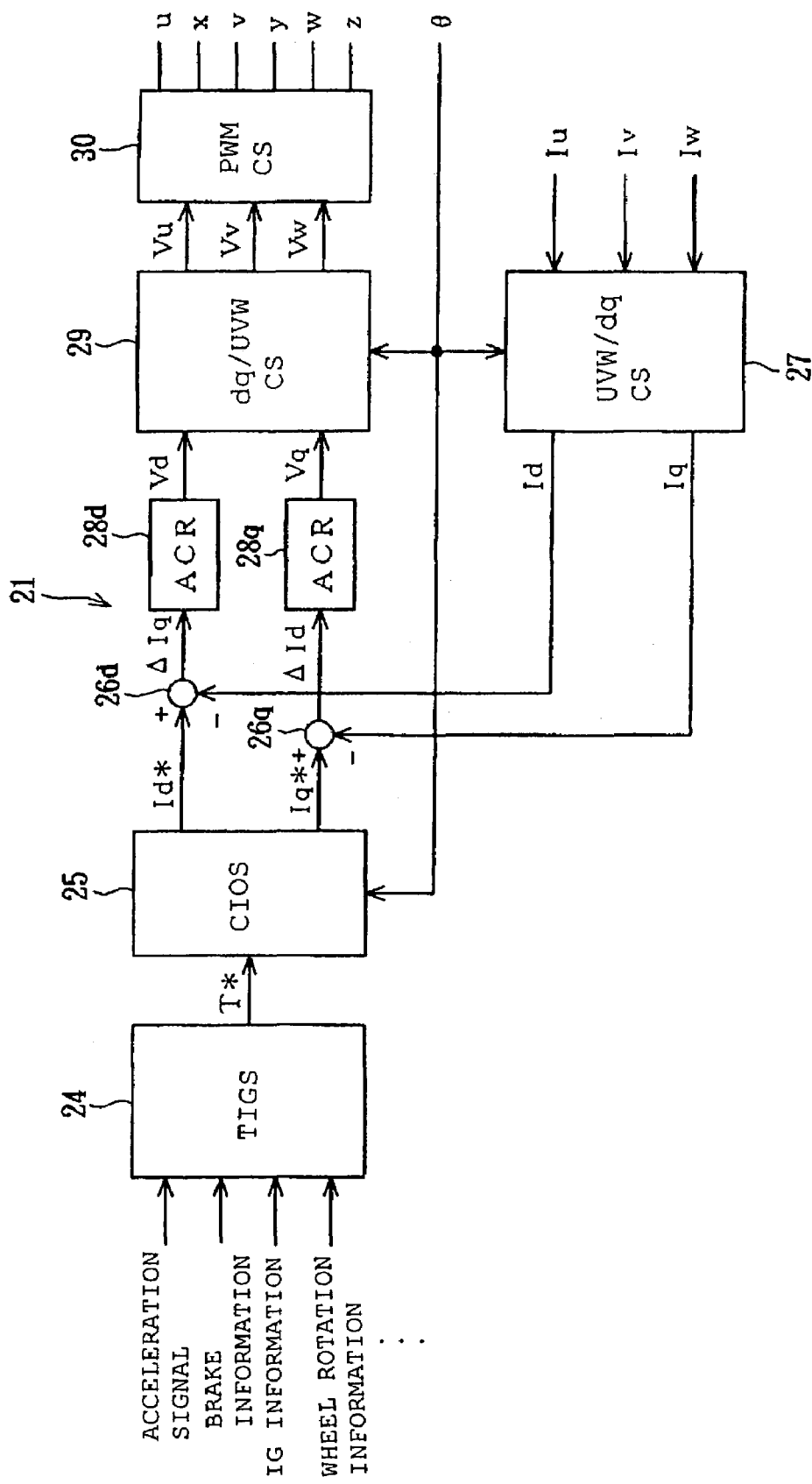
FIG. 2 is a functional block diagram showing diagrammatically the construction of the drive control section.

FIG. 2 is a functional block diagram showing diagrammatically the layout of the drive control section 21. The drive control section 21 is arranged to perform vector control of the motor 9 by means of the main inverter circuit 3. The various types of information that are supplied to the ECU 18 as described above are output to the torque instruction generating section (TIGS) 24. The torque instruction generating section 24 generates a torque instruction T* that is to be output to the motor 9 in accordance with this information and outputs this torque instruction T* to a current instruction output section (CIOS) 25.

When the current instruction output section 25 is supplied with the torque instruction T*, it is arranged to output an exciting current instruction Id* and torque current instruction Iq* to subtractors 26d and 26q as respective subtraction values, by using the rotational speed obtained by time differentiation of the rotor position signal θ that is output by the rotary position sensor 17 and/or a data table or the like that is held in the current instruction output section 25 itself.

The UVW/dq conversion section (UVW/dqCS) 27 is supplied with the current signals Iu, Iv and Iw that are output by the current sensor 19 and the position signal θ. The UVW/dq conversion section 27 is arranged to simultaneously perform orthogonal co-ordinate conversion of the three-phase current signals Iu, Iv and Iw and d (direct) axis and q (quadrature) axis conversion so as to obtain the d axis and q axis currents Id and Iq. The d axis and q axis currents Id and Iq are respectively output to the subtractors 26d, 26q as subtraction values.

The subtractors 26d, 26q respectively output to ACRs (automatic current regulators) 28d and 28q the differences Δ Id and Δ Iq of the values that are input thereto. The ACRs 28d and 28q are blocks that perform PI (proportional-integral) control and that use the input differences ΔId and ΔIq to generate d axis and q axis voltage instructions Vd and Vq and output these to a dq/UVW conversion section (dq/UVWCS) 29.

A position signal θ is supplied to the dq/UVW conversion section 29. The dq/UVW conversion section 29 is arranged to obtain three-phase voltage instructions Vu, Vv and Vw by simultaneously performing orthogonal co-ordinate conversion of the d axis and q axis voltage instructions Vd and Vq and three-phase co-ordinate conversion. In this case, the relationship between the d axis and q axis voltage instructions Vd, Vq and the phase voltage amplitude V of the motor 9 is given by expression (1).

$$V = \sqrt{(Vd^2 + Vq^2)/3} \qquad (1)$$

Also, the conversion expression is expression (2).

$$\begin{bmatrix} Vu \\ Vv \\ Vw \end{bmatrix} = \sqrt{\frac{2}{3}} \begin{bmatrix} \cos\theta & -\sin\theta \\ \cos(\theta - 2\pi/3) & -\sin(\theta - 2\pi/3) \\ \cos(\theta + 2\pi/3) & -\sin(\theta - 2\pi/3) \end{bmatrix} \begin{bmatrix} Vd \\ Vq \end{bmatrix} \qquad (2)$$

Also, as the conversion expression employed in the UVW/dq conversion section 27, the inverse matrix of the matrix on the right-hand side of expression (1) is employed.

The three-phase voltage instructions Vu, Vv and Vw are supplied to a PWM control section (PWMCS) 30. The PWM control section 30 performs PWM modulation on the three-phase voltage instructions Vu, Vv and Vw and outputs gate signals u to z to the gates of the respective IGBTs 7u to 7z that constitute the main inverter circuit 3.

Figure 3:
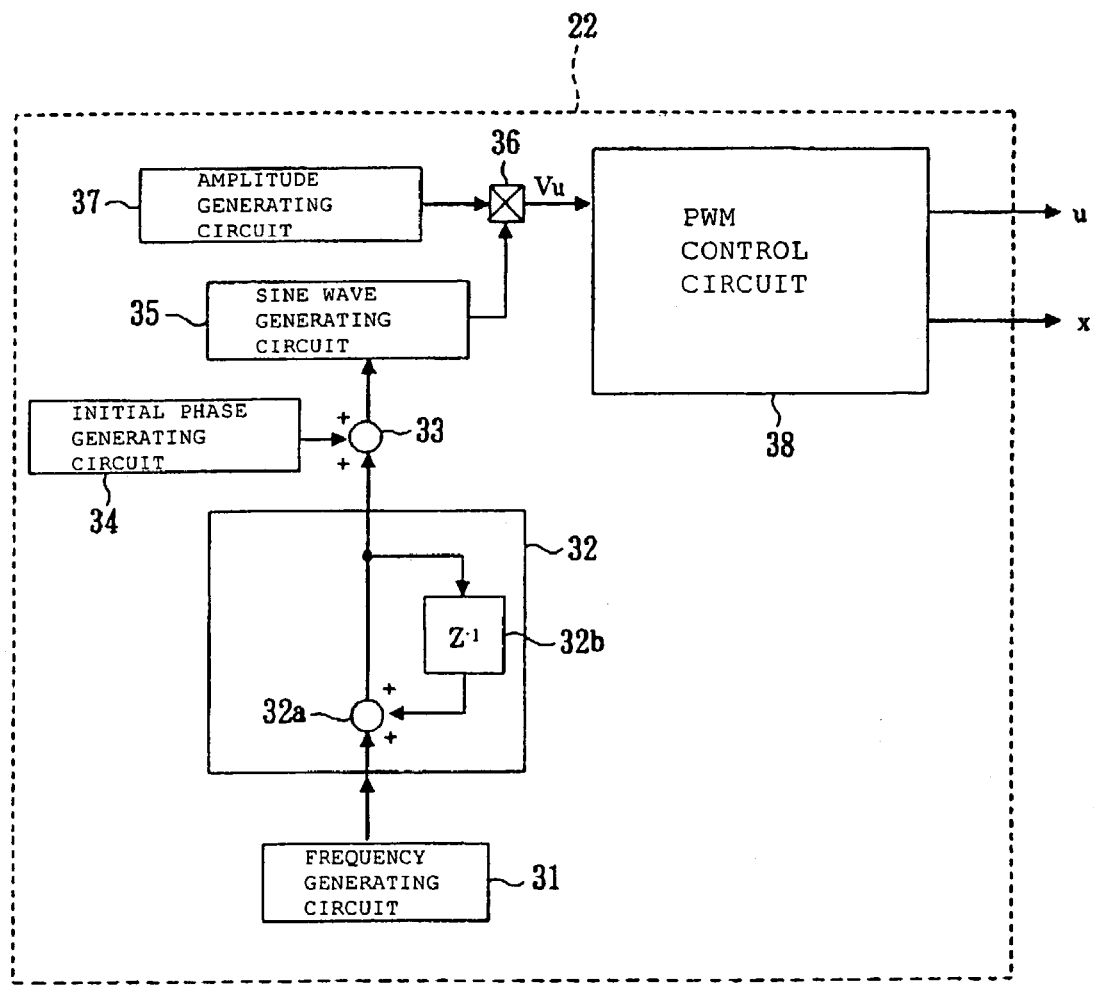
FIG. 3 is a functional block diagram showing only the U phase (U-phase) of the internal layout of the discharge control section.

FIG. 3 is a functional block diagram of the internal construction of the discharge control section 22, showing only the U phase (U-phase). FIG. 4 is a timing chart showing the signal waveforms of the various sections. A frequency generating circuit 31 (FGC) outputs a phase reference value to an oscillation circuit 32 (OC) (see FIG. 4A).

The oscillation circuit 32 comprises an adder 32a and delay circuit 32b. The result of the addition of the adder 32a is delayed by unit time by the delay circuit 32b and the adder 32a is arranged to add the aforesaid addition result and the unit data output by the frequency generating circuit 31. Specifically, the output data waveform of the oscillation circuit 32 increases linearly as shown in FIG. 4B and when the maximum value of the adder 32a is reached the adder 32a is cleared to zero; a sawtooth wave is thereby produced.

The output data of the oscillation circuit (OC) 32 is output to an adder 33 where it is added to the initial phase value that is output from an initial phase generating circuit (IPGC) 34 (see FIG. 4C). As a result, the output data waveform of the adder 33 represents the result of shifting the output data waveform of the oscillation circuit 32 in the forward direction by the amount of the initial phase value, as shown in FIG. 4D. It should be noted that, when the rotor position of the motor 9 is in a condition in which it may be detected, the initial phase generating circuit 34 may be employed for setting the initial phase with the object of commencing discharge control from the optimum phase (of course, this is not an essential construction).

A sine wave generating circuit (SWGC) 35 outputs sine wave data to a multiplier 36, using the output data of the adder 33 as the phase value (see FIG. 4E). It should be noted that the frequency of the sine wave is set in a high frequency region of for example the order of a few kHz. The data obtained by multiplication of the output data of the adder 33 and the amplitude setting data that is output by the amplitude generating circuit (AGC) 37 (see FIG. 4F) by the multiplier 36 is output to the PWM control circuit 38 as the voltage instruction Vu (see FIG. 4G).

As is well known, the PWM control circuit 38 generates a U phase PWM signal u by comparing the level of the internally generated PWM carrier wave and the voltage instruction Vu (see FIG. 4H). It also generates the PWM signal x on the lower arm side by inverting the U phase PWM signal u (see FIG. 4I).

The basic construction in respect of the V phase and W phase is identical. Also, although, in the waveform shown in FIG. 4, the output data of the frequency generating circuit 31 changes during the period shown in the Figure, this is merely in order to facilitate understanding of the operation of the various sections and, in an actual case, such a change may not necessarily occur.

Figure 6:
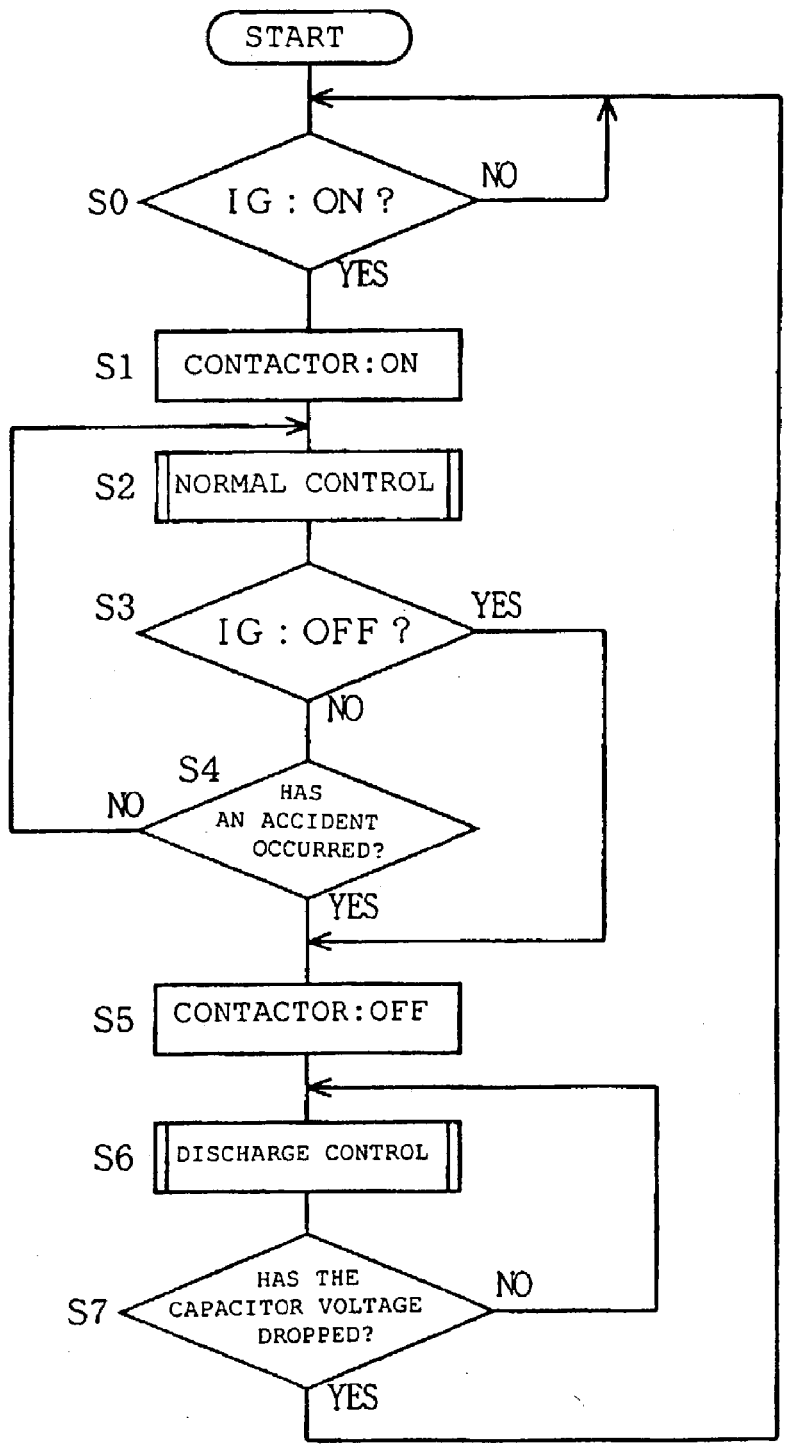
FIG. 6 is a flow chart showing the particulars of the control relating to a portion according to the gist of the present invention performed by the CPU (Central Processing Unit) of the ECU (Electronic Control Unit)

Next, the operation of this embodiment is described with reference to FIG. 6. FIG. 6 is a flow chart showing the particulars of the control performed by the CPU 18a of the ECU 18 in respect of a portion relating to the gist of the present invention.

Referring to the ignition information, the CPU 18a stands by (step S0) until the ignition is turned ON. When the ignition is turned ON ("YES"), contactor 2 is turned ON and the DC power of the battery 1 is supplied to the main inverter circuit 3 (step S1). The selector 23 of the inverter control device 20 then selects the drive control section 21, causing normal control to be performed (step S2) in accordance with the accelerator information and/or brake information etc. That is, the electric vehicle is driven by driving the motor 9 under vector control.

Next, (step S4) the CPU 18a ascertains whether or not the ignition has been turned OFF (step S3) or whether or not an accident to the vehicle has occurred, by using the information obtained by the signal of the acceleration sensor or CAN (Controller Area Network). If the result in both of these steps is "NO", the CPU 18a returns to step S2. If the result of either of these steps is "YES", the contactor 2 is turned OFF (step S5) and the selector 23 selects the discharge control section 22 and causes this to perform discharge control (step S6).

Specifically, at the time when the contactor 2 is turned OFF, the smoothing capacitor 6, which has a capacitance of the order of for example 5000 μF, is in a condition in which charge has been accumulated thereon. The accumulated charge of the smoothing capacitor 6 is discharged by actuating the discharge control section 22. As shown in FIG. 4, the discharged control section 22 outputs a sine wave of a high frequency of the order of a few kHz that is generated with a phase that is completely independent of the vector control performed by the drive control section 21. When this is done, high-frequency voltage is applied to the windings 11u, 11v and 11w of the respective phases of the motor 9, causing the charge accumulated on the smoothing capacitor 6 to be dissipated by core loss and copper loss. The terminal voltage of the smoothing capacitor 6 therefore drops. In this case, neglecting the resistive component, the current I flowing in the winding 11 of the motor 9 when a high-frequency voltage V is applied to it is given by expression (3), taking the inductance of the motor as L:

$$I = V/\omega L \quad (3)$$

A high-frequency rotating magnetic field is thereby generated in the stator of the motor 9, but since the inertia of the motor 9, which stops at the time point where the contactor 2 is turned OFF, acts as a resistive force, synchronization is impossible and rotation does not take place. The CPU 18a continues discharge control by returning to the step S6 while the terminal voltage of the smoothing capacitor 6 has not yet dropped sufficiently ("NO" in step S7). When the voltage has dropped sufficiently ("YES"), the CPU 18a returns to step S0.

As described above, with this embodiment, when the contactor 2 disconnects the connection between the battery 1 and the smoothing capacitor 6, the discharge control section 22 of the inverter control device 20 controls the main inverter circuit 3 to apply high-frequency voltage to the stator windings 11u to 11w of the motor 9 so as to discharge the charge accumulated on the smoothing capacitor 6.

Consequently, the charge accumulated on the smoothing capacitor 6 can be discharged and dissipated by the core loss and/or copper loss generated by passing the high-frequency current through the windings 11u to 11w, without causing the motor 9 to rotate. Also, since, in this case, the purpose of the rotating magnetic field generated in the stator is not to rotate the motor 9, this rotating magnetic field may be generated with a phase that is completely independent of the vector control that is used to drive the motor 9 in normal operation. Discharging of the smoothing capacitor 6 may therefore be achieved even if the rotary position sensor 17 or current sensor 19 has failed or the signal line is disconnected.

Furthermore, since, with this embodiment, the motor 9 is an embedded type permanent magnet motor, which has considerable core loss, discharging may be performed more rapidly by making use of this core loss to dissipate the charge of the smoothing capacitor 6.

In addition, since the electric vehicle incorporates an inverter 100 and control device 20, which are arranged to perform drive control of the motor 9 that is used for driving the vehicle, the accumulated charge of the smoothing capacitor 6 may be discharged without rotating the motor 9, for example while the electric vehicle 9 is stationary.

SECOND EMBODIMENT

Figure 7:
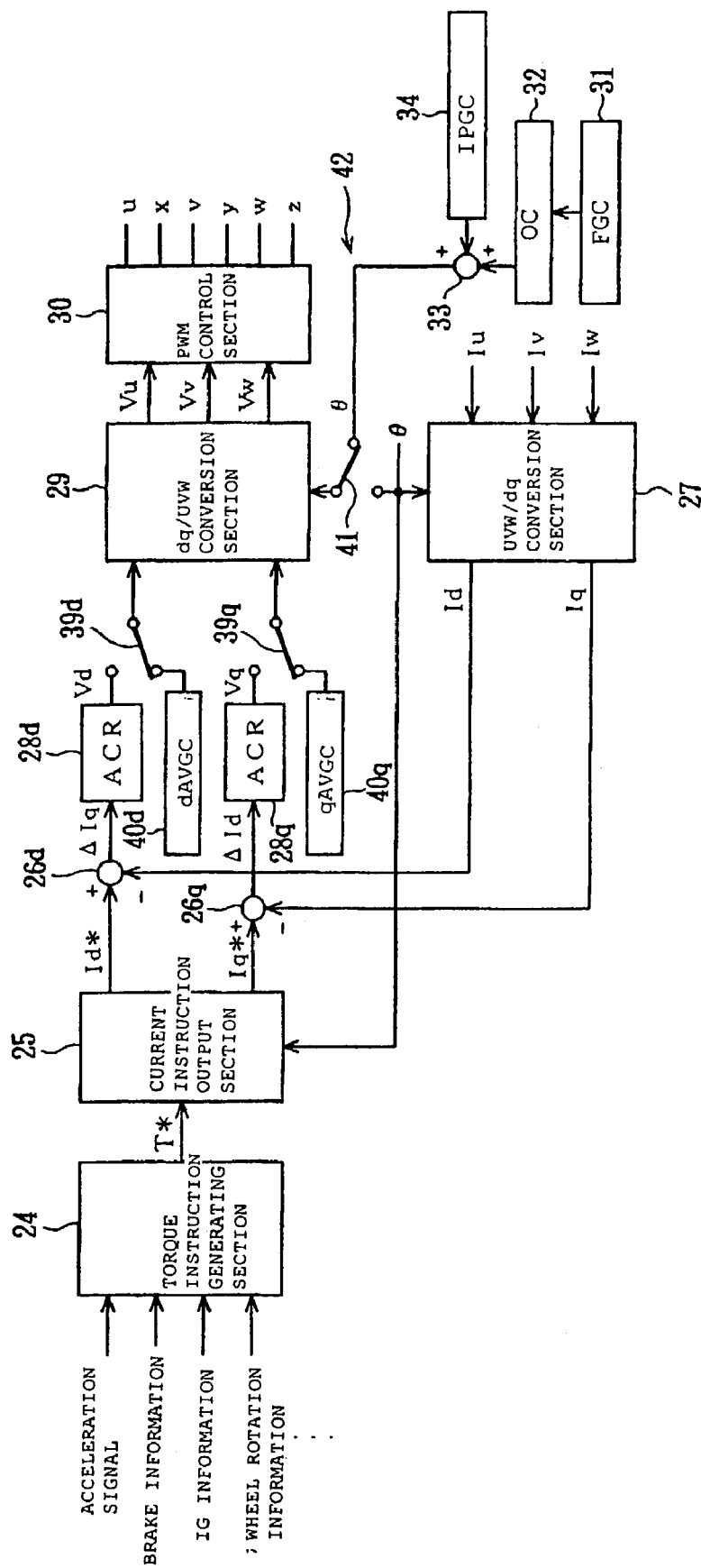
FIG. 7 is a view corresponding to FIG. 2 showing a second embodiment of the present invention.

FIG. 7 and FIG. 8 show a second embodiment of the present invention. Parts which are the same as in the case of the first embodiment are given the same reference symbols and further description thereof is omitted, only the parts that are different being described hereinbelow. In this second embodiment, the two voltage input terminals of the dq/UVW conversion section 29 constituting the drive control section 21 are connected to the moveable contacts of changeover switches 39d, 39q. Also, the output terminals of ACRs 28d and 28q are connected to one of the fixed contacts of changeover switches 39d, 39q; the output terminals of the d axis voltage generating circuit 40d and the q axis voltage generating circuit 40q are connected to the other fixed contact points of changeover switches 39d, 39q.

Also, the phase input terminal of the dq/UVW conversion section 29 is connected to the moveable contact of a changeover switch 41 and the position signal θ that is output by the rotary position sensor 17 is supplied to one of the fixed contacts of the changeover switch 41. The frequency generating circuit 31, oscillation circuit 32, adder 33 and initial phase generating circuit 34 are constituent elements of the discharge control section 22 in the first embodiment and the phase signal θ that is output from the adder 33 is supplied to the other fixed contact of the changeover switch 41. Changeover of the changeover switches 39d, 39q and 41 is performed in linked fashion by means of the CPU 18a of the ECU 18.

In the above, the frequency generating circuit 31, oscillation circuit 32, adder 33, initial phase generating circuit 34, changeover switches 39d, 39q and 41, the d axis voltage generating circuit 40d, q axis voltage generating circuit 40q and changeover switch 41 constitute the discharge control section (control circuit) 42.

Next, the operation of the second embodiment will be described. The particulars of the control that is performed by the CPU 18a are basically the same as shown in FIG. 6 with reference to the first embodiment but, during the normal control of step S2, the moveable contacts of the changeover switches 39d, 39q and 41 are connected with the fixed contacts of the ACR 28d and 28q and the rotary position sensor 17. And in the discharge control in step S6, the aforesaid moveable contacts are changed over so as to be connected to the fixed contacts of the d axis voltage generating circuit 40d, q axis voltage generating circuit 40q and adder 33.

That is, although, in the first embodiment, the control mode during discharge is changed over to a control mode that is completely separate from the vector control that is performed by the drive control section 21, the second embodiment is arranged such that control is effected with the configuration of the vector control performed by the drive control section 21 partially modified during discharge.

FIG. 8 is a timing chart of the discharge control section 42. In the same way as in the first embodiment, the adder 33 outputs a phase signal θ' that does not depend on the motor 9, whose rotation has been stopped, to the phase input terminal of the dq/UVW conversion section 29 (see FIG. 8A). Also, in place of ACRs 28d and 28q, the d axis voltage generating circuit 40d and q axis voltage generating circuit 40q output to the dq/UVW conversion section 29 (see FIG. 8B and FIG. 8C) for example voltage instructions Vd, Vq which are respectively a fixed value of a prescribed level or 0.

Using the voltage instructions Vd, Vq and the phase signal θ', the dq/UVW conversion section 29 generates three-phase voltage instructions Vu, Vv and Vw (see FIG. 8D). The PWM control section 30 uses the three-phase voltage instructions Vu, Vv and Vw to generate PWM gate signals u to z (see FIG. 8E).

Then, in the same way as in the first embodiment, high-frequency voltage is applied to the windings 11u to 11w of the motor 9 to generate a high-speed alternating magnetic field in the stator. Of course, the motor 9 cannot rotate in synchronization with this high-speed alternating magnetic field, so the charge accumulated on the smoothing capacitor 6 is discharged by the core loss and copper loss produced by the high-frequency current flowing in the windings 11u to 11w.

In cases where it may be envisaged that over-current might be generated in the windings 11u to 11w in the above construction, this may be dealt with by current restriction.

In the same way as described above, with the second embodiment, when the smoothing capacitor 6 is discharged, the discharge control section 42, using the d axis voltage generating circuit 40d and q axis voltage generating circuit 40q, outputs voltage instructions Vd, Vq which are respectively of a fixed value of prescribed level i.e. 0 to the dq/UVW conversion section 29. The same benefits as in the case of the first embodiment are therefore obtained.

Also, in the technique disclosed in Laid-open Japanese Patent Publication No. H. 9-70196, the smoothing capacitor 6 is discharged by setting the torque current component Iq to zero and setting the exciting current component Id to a prescribed value but, in this case, vector control is performed in the same way as during normal drive so it is not possible to set the current components Iq and Id without obtaining the phase θ of the rotating magnetic field on the secondary side.

In contrast, with the construction of the second embodiment, the voltage instructions Vd and Vq for vector control are directly set, so setting can be performed without dependence on the aforesaid phase θ. Furthermore, since setting is performed independently of the phase θ, a rotating magnetic field such as would rotate the motor 9 is not generated.

THIRD EMBODIMENT

Figure 9:
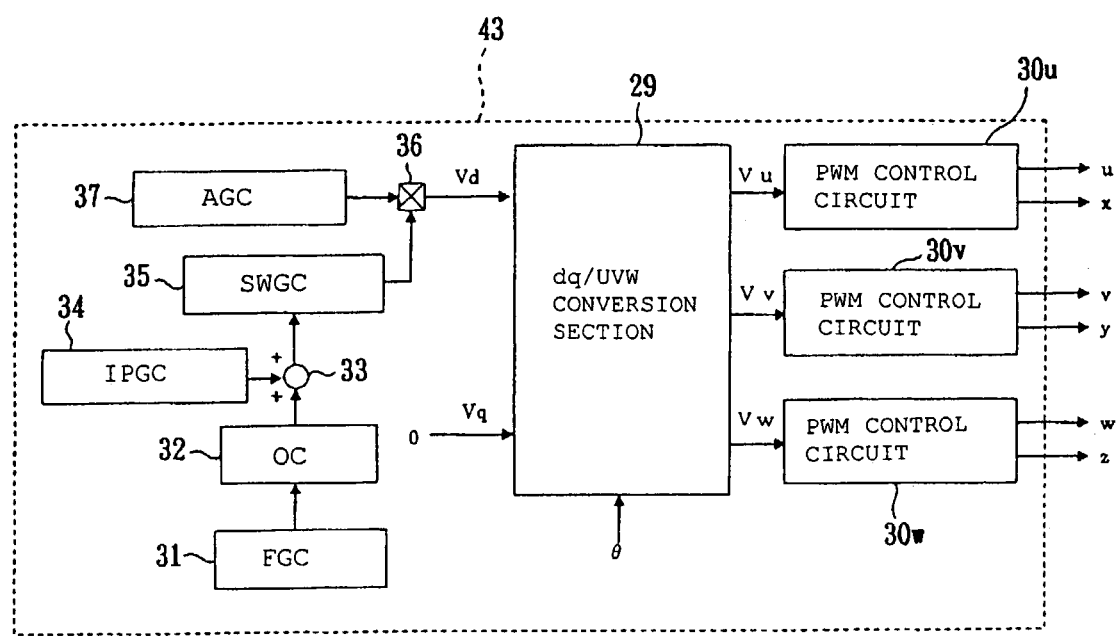
FIG. 9 is a view showing only the layout of a portion that relates to the discharge control section according to a third embodiment of the present invention.
Figure 10:
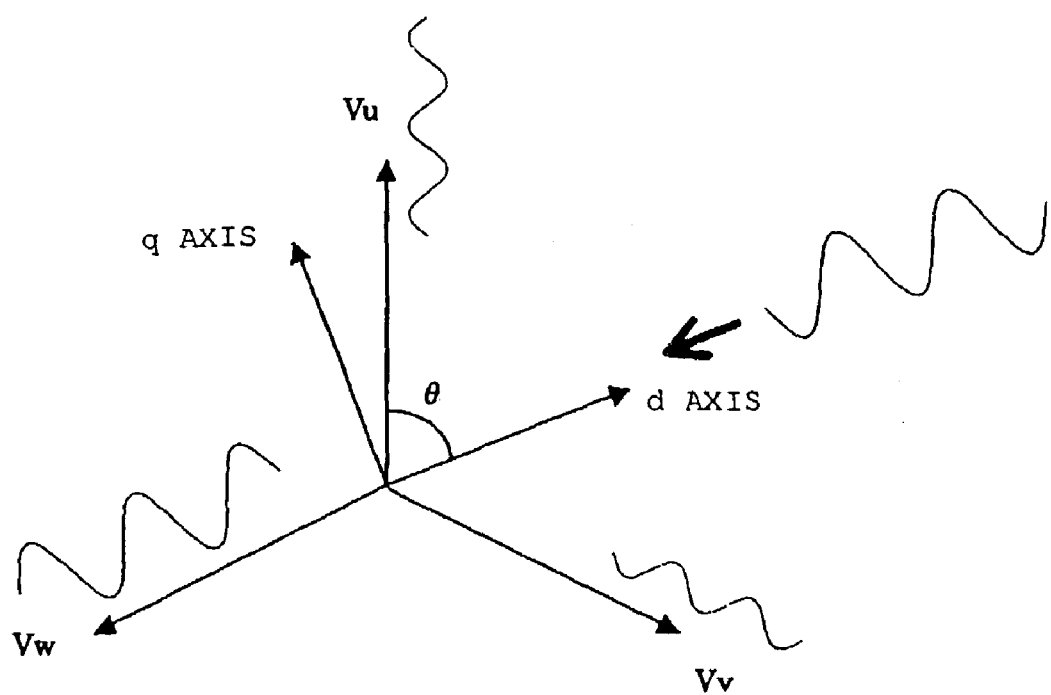
FIG. 10 is a vector diagram showing the relationship of the UVW three-phase co-ordinates and the dq axes co-ordinates.
Figure 11:
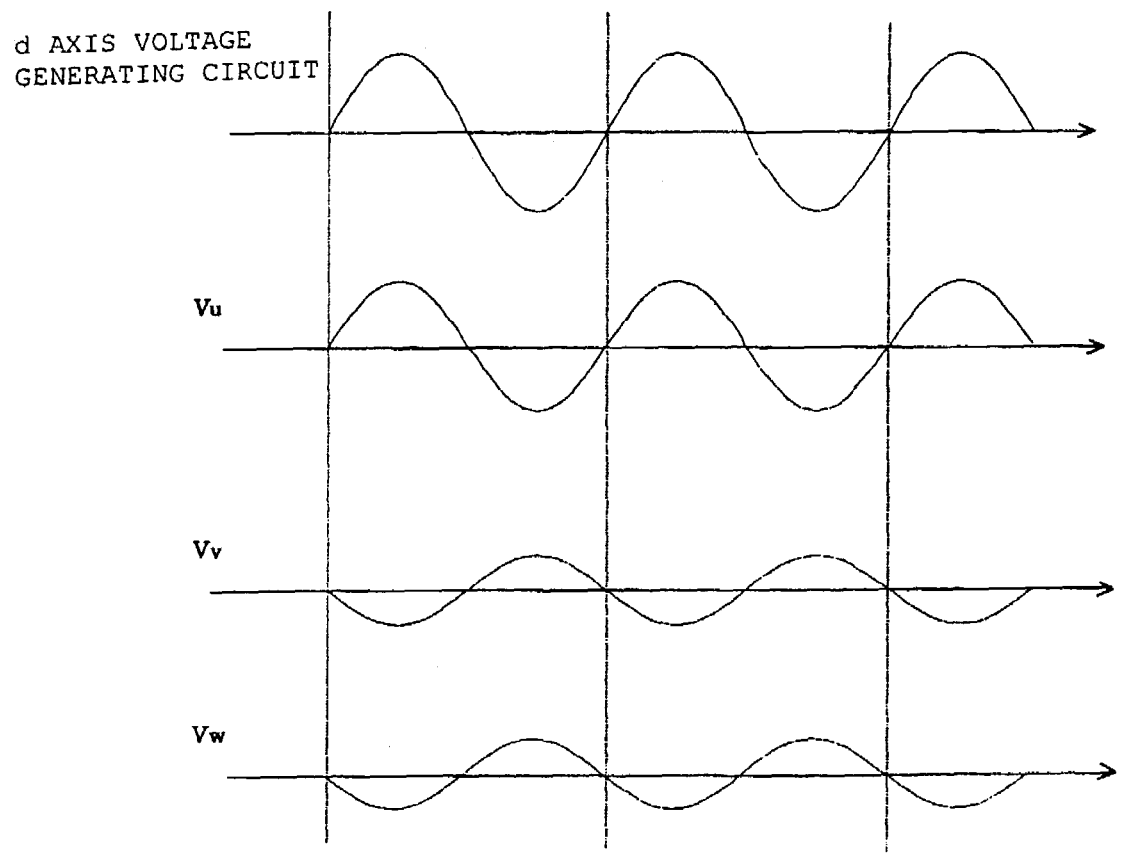
FIG. 11 is a timing chart showing the signal waveforms of the various sections in the case where $\theta=0$.

A third embodiment of the present invention is shown in FIG. 9 to FIG. 11. Parts which are the same as in the case of the first and second embodiment are given the same reference symbols and further description thereof is omitted, only the parts that are different being described below. FIG. 9 shows only the layout of the portion relating to the discharge control section (control circuit) 43 (portion of the layout whereby changeover to the discharge control side is effected by means of the changeover switches 39d, 39q and 41, as in the second embodiment).

A construction identical with that of the circuits 31 to 37 of the first embodiment is arranged at the d axis input terminal of the dq/UVW conversion section 29. Also, a fixed value 0 is applied to the q axis input terminal and a fixed phase value θ is applied to the phase input terminal. Further, the PWM control circuits 30u to 30w constitute the internal construction of the PWM control section 30, whereby PWM signals are generated corresponding to each phase.

Next, the operation of the third embodiment will be described with reference to FIG. 10 and FIG. 11. The d axis voltage instruction Vd that is output by the multiplier 36 is output as sine wave data as shown in FIG. 11A. FIG. 10 is a vector diagram showing the relationship of the UVW three-phase co-ordinates and the dq axes co-ordinates. Specifically, since the d axis voltage instruction Vd is projected onto the three-phase co-ordinate axes in accordance with the value of the fixed phase value θ, this value of θ determines which magnetic pole phase the alternating magnetic field is applied to.

FIG. 11 shows the case where the fixed face value θ=0. In this case, the U axis of the three-phase co-ordinates and the d axis of the dq axes co-ordinates coincide. The voltage instruction Vu is output with the same phase as the d axis voltage instruction Vd and the voltage instructions Vv and Vw are output with opposite phase to the voltage instruction Vu (see FIG. 11B). That is, in expression (2), if we assume that Vd=sin ω, Vq=0 and θ=0 (where the coefficient $\sqrt{(2/3)}$ on the right-hand side is neglected), the voltage instructions Vu, Vv and Vw are then:

$$V u=\sin \omega, \; V v=-\sin \omega/2, \; V w=-\sin \omega/2 \tag{4}$$

As a result, the magnetic field that is generated in the stator of the motor 9 is an alternating magnetic field wherein the polarity of the magnetic poles corresponding to each phase is changed over alternately to N, S, N, S, . . . . However, no rotating magnetic field is generated, so the motor 9 cannot be activated.

It should be noted that, in a condition in which the magnetic pole positions of the motor 9 may be detected, discharge of the smoothing capacitor 6 may be performed more rapidly if θ is set such that the rotor coincides with the d axis direction (magnetic pole direction), since the inductance is then small.

As described above, in the third embodiment, the discharge control section 43 applies high-frequency voltage such as to generate an alternating magnetic field in the stator of the motor 9, so the smoothing capacitor 6 may be discharged without rotating the motor 9.

FOURTH EMBODIMENT

Figure 12:
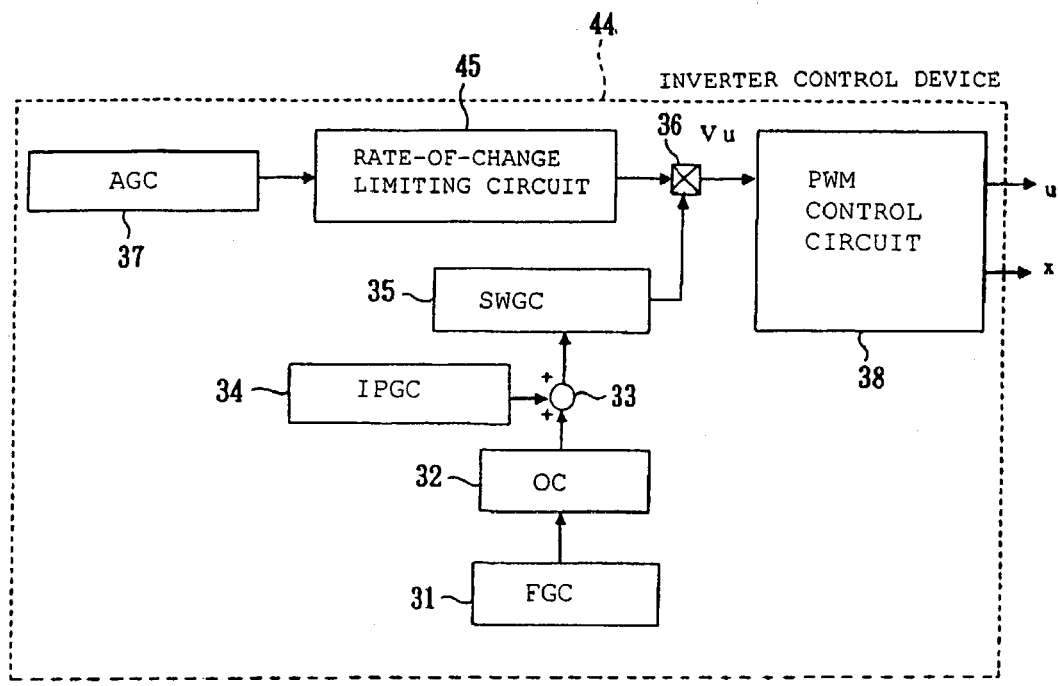
FIG. 12 is a view corresponding to FIG. 3 showing a fourth embodiment of present invention.

FIG. 12 shows a fourth embodiment of the present invention. Only parts that are different from the first embodiment are described. In the discharge control section (control circuit) 44 of the fourth embodiment, a rate-of-change limiting circuit 45 is interposed between the amplitude generating circuit 37 and multiplier 36 in the discharge control section 22 of the first embodiment. The rate-of-change limiting circuit 45 changes the output data of the amplitude generating circuit 37 such that, at the time of commencement of the discharge control, the voltage is 0 V and increases linearly from this time point until a voltage of a few hundred V is reached after for example a few hundred msec, when discharge is assumed to be completed.

That is, from expression (3), if the voltage V is gradually increased, the current I i.e. the torque also gradually increases. Consequently, the rush current in the initial period on start-up may be suppressed and rattling noises produced by the gears etc. of the reduction gear 15 in the initial period of discharge may also be suppressed. In addition, the amount of the discharge current also gradually increases, so the discharge time can be shortened.

FIFTH EMBODIMENT

Figure 13:
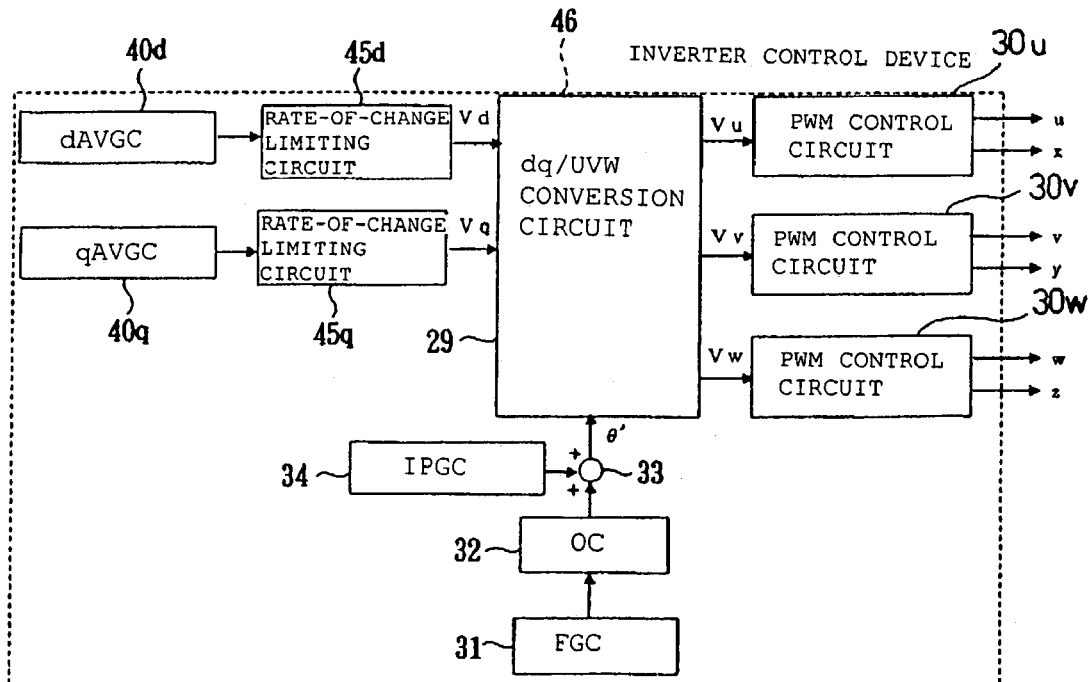
FIG. 13 is a view corresponding to FIG. 9 showing a fifth embodiment of the present invention.

FIG. 13 shows a fifth embodiment of the present invention. Only parts that are different from the second embodiment are described. In the discharge control section (control circuit) 46 of the fifth embodiment, rate-of-change limiting circuits 45d, 45q are inserted in the same way as in the case of the fourth embodiment between the d axis voltage generating circuit 40d, q axis voltage generating circuit 40q and the dq/UVW conversion section 29 in the discharge control section 42 of the second embodiment (however, if Vq=0 is set, the circuit 45q is unnecessary).

With the fifth embodiment constructed in this way, the same benefits as in the case of the fourth embodiment may be obtained.

SIXTH EMBODIMENT

Figure 14:
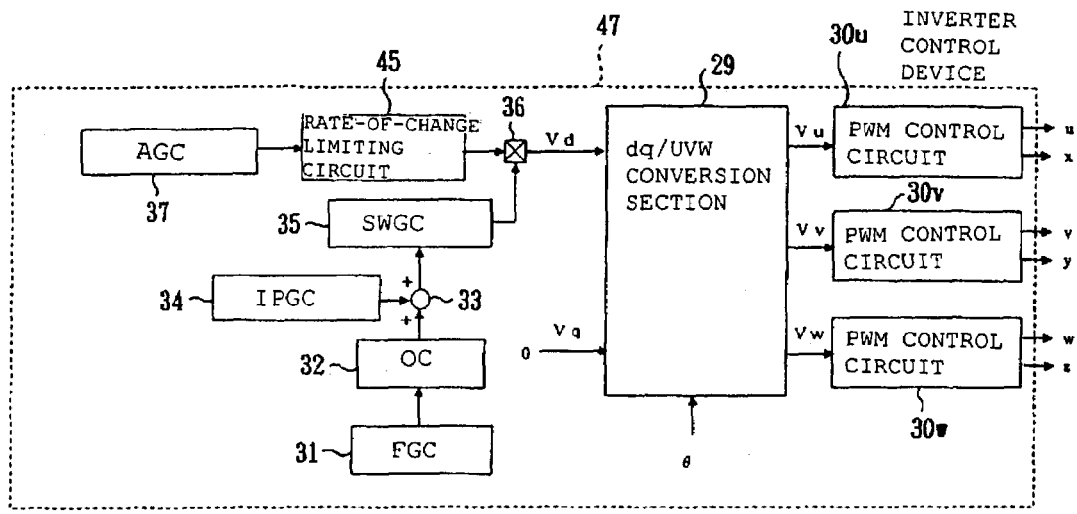
FIG. 14 is a view corresponding to FIG. 9 showing a sixth embodiment of the present invention.

FIG. 14 shows a sixth embodiment of the present invention. Only parts that are different from the third embodiment are described. In the discharge control section (control circuit) 47 of the sixth embodiment, a rate-of-change limiting circuit 45 as in that of the fourth embodiment is inserted between the amplitude generating circuit 37 and multiplier 36 in the discharge control section 43 of the third embodiment.

With the sixth embodiment constructed in this way, the same benefits as in the case of the fourth embodiment can be obtained.

SEVENTH EMBODIMENT

Figure 15:
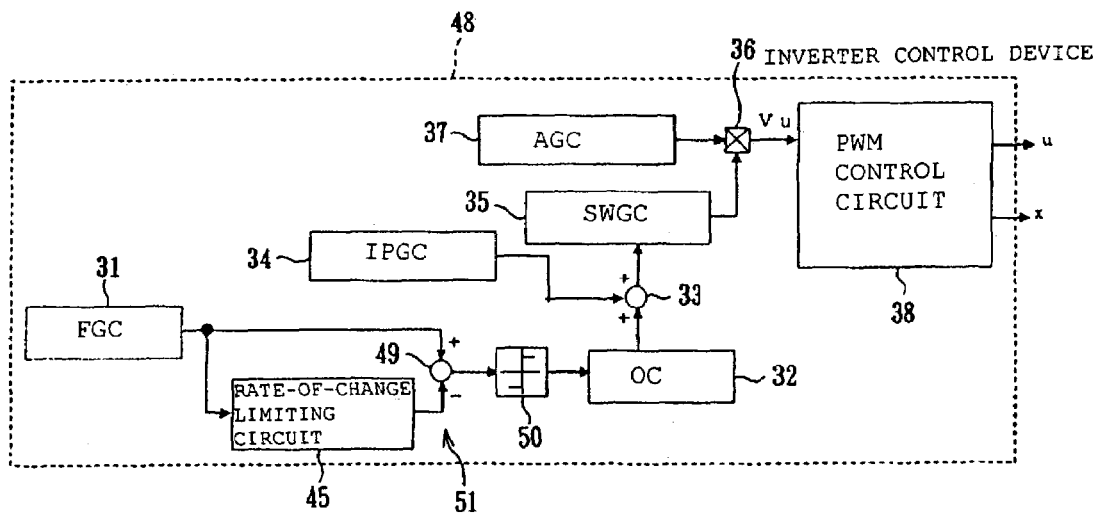
FIG. 15 is a view corresponding to FIG. 3 showing a seventh embodiment of the present invention.
Figure 16:
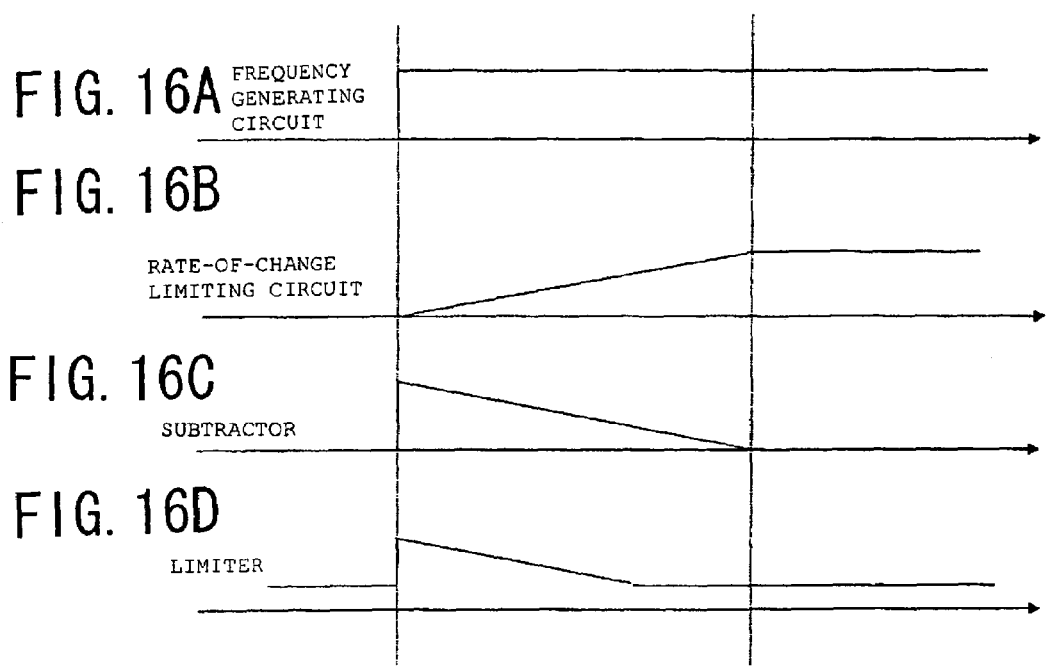
FIG. 16A, FIG. 16B, FIG. 16C and FIG. 16D are timing charts showing the signal waveforms of the various sections in the discharge control section.

FIG. 15 and FIG. 16 show a seventh embodiment of the present invention. Only parts that are different from the first embodiment are described. In the discharge control section (control circuit) 48 of the seventh embodiment, a rate-of-change limiting circuit 45 as in that of the fourth embodiment, a subtractor 49 and a limiter 50 are inserted between the frequency generating section 31 and oscillation circuit 32 in the discharge control section 22 of the fourth embodiment. These items constitute a frequency gradual reduction circuit 51.

Specifically, the output data of the frequency generating circuit 31 is supplied to the rate-of-change limiting circuit 45 and subtractor 49 and the output data of the rate-of-change limiting circuit 45 is supplied as the subtraction value to the subtractor 49. The output data of the subtractor 49 is supplied through the limiter 50 to the oscillation circuit 32.

FIG. 16 is a timing chart showing the respective signal waveforms of the above structural portions in the discharge control section 48. The output data of the subtractor 49 shown in FIG. 16C is the difference of that of FIG. 16A and FIG. 16B and so decreases linearly. The limiter 50 shown in FIG. 16D defines the lower limit of the output data of the subtractor 49. Specifically, this is because, if the data supplied to the oscillation circuit 32 is zero, the phase data that is output by the adder 33 no longer shows any change.

Thus, if the data supplied to the oscillation circuit 32 gradually decreases, the frequency of the voltage instruction Vu gradually decreases, so, from expression (3), the current I concomitantly gradually increases.

With the seventh embodiment constructed as described above, the same benefits as in the case of the fourth embodiment can be obtained.

EIGHTH EMBODIMENT

Figure 17:
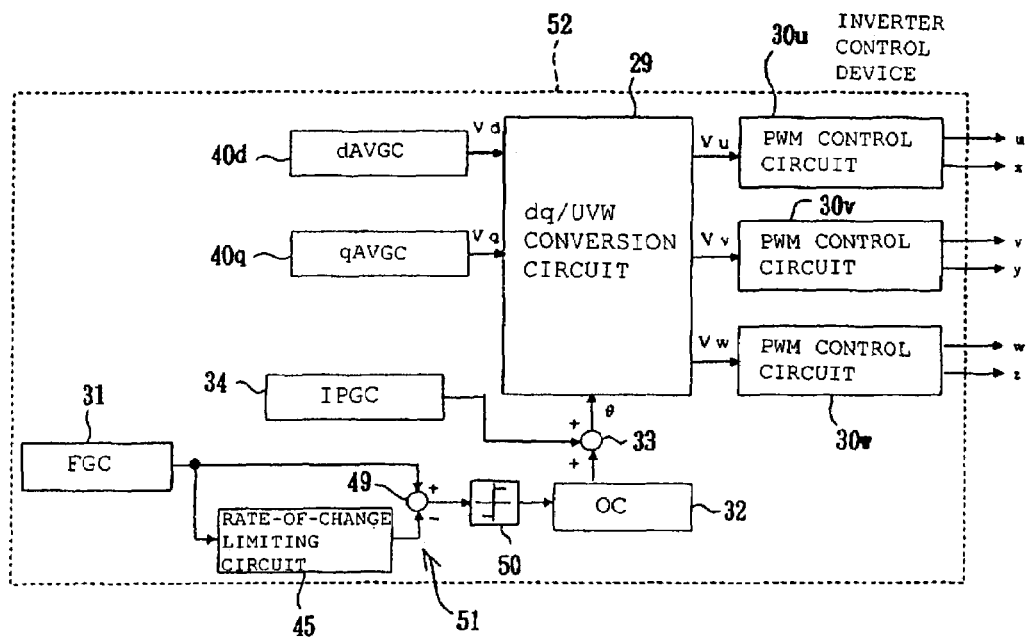
FIG. 17 is a view corresponding to FIG. 9 showing an eighth embodiment of the present invention.

FIG. 17 shows an eighth embodiment of the present invention. Only parts that are different from the second embodiment are described. In the discharge control section (control circuit) 52 of the eighth embodiment, a frequency gradual reduction circuit 51 as in that of the seventh embodiment is inserted between the frequency generating circuit 31 and oscillation circuit 32 in the discharge control section 42 of the second embodiment.

With the eighth embodiment constructed as described above, the same benefits as in the case of the seventh embodiment can be obtained.

NINTH EMBODIMENT

Figure 18:
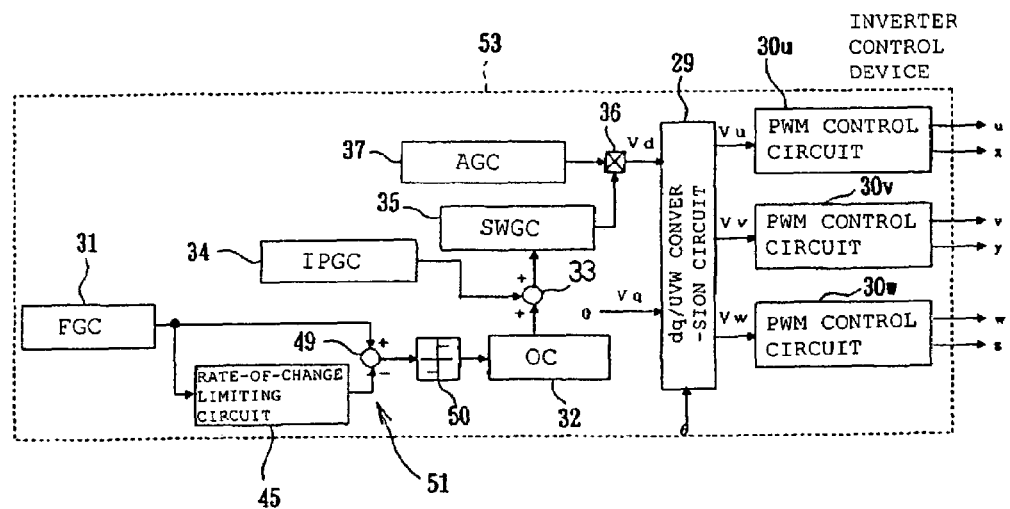
FIG. 18 is a view corresponding to FIG. 9 showing a ninth embodiment of the present invention.

FIG. 18 shows a ninth embodiment of the present invention. Only parts that are different from the third embodiment are described. In the discharge control section (control circuit) 53 of the ninth embodiment, a frequency gradual reduction circuit 51 as in that of the seventh embodiment etc. is inserted between the frequency generating circuit 31 and the oscillation circuit 32 in the discharge control section 43 of the third embodiment.

With the ninth embodiment constructed as described above, the same benefits as in the case of the seventh embodiment can be obtained.

TENTH EMBODIMENT

Figure 19:
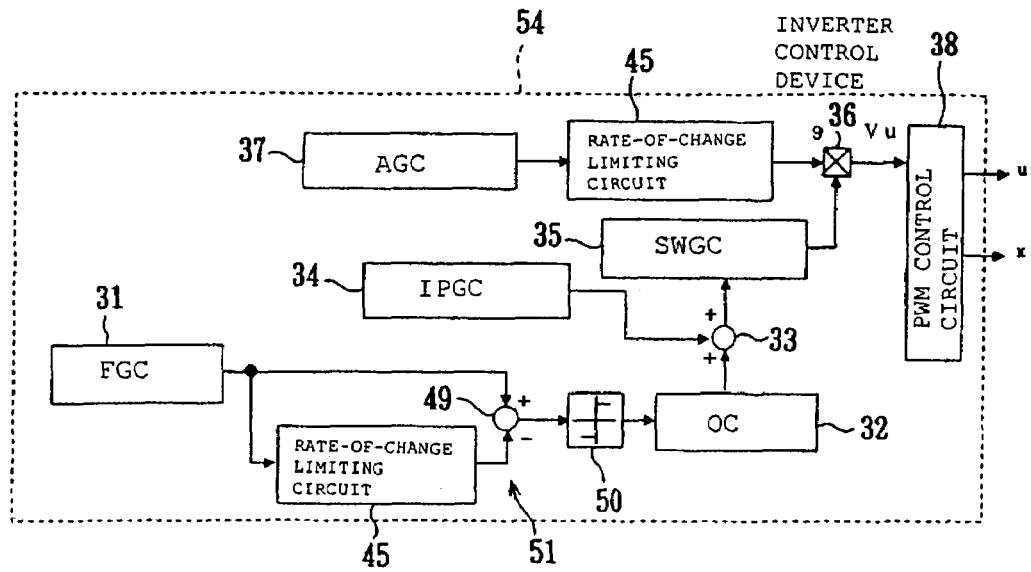
FIG. 19 is a view corresponding to FIG. 3 showing a tenth embodiment of the present invention.

FIG. 19 shows a tenth embodiment of the present invention. Only parts that are different from the fourth embodiment are described. In the discharge control section (control circuit) 54 of the tenth embodiment, a frequency gradual reduction circuit 51 as in that of the seventh embodiment etc. is inserted between the frequency generating circuit 31 and oscillation circuit 32 in the discharge control section 44 of the fourth embodiment.

With the tenth embodiment constructed as described above, the same benefits as in the case of the seventh embodiment can be obtained.

ELEVENTH EMBODIMENT

Figure 20:
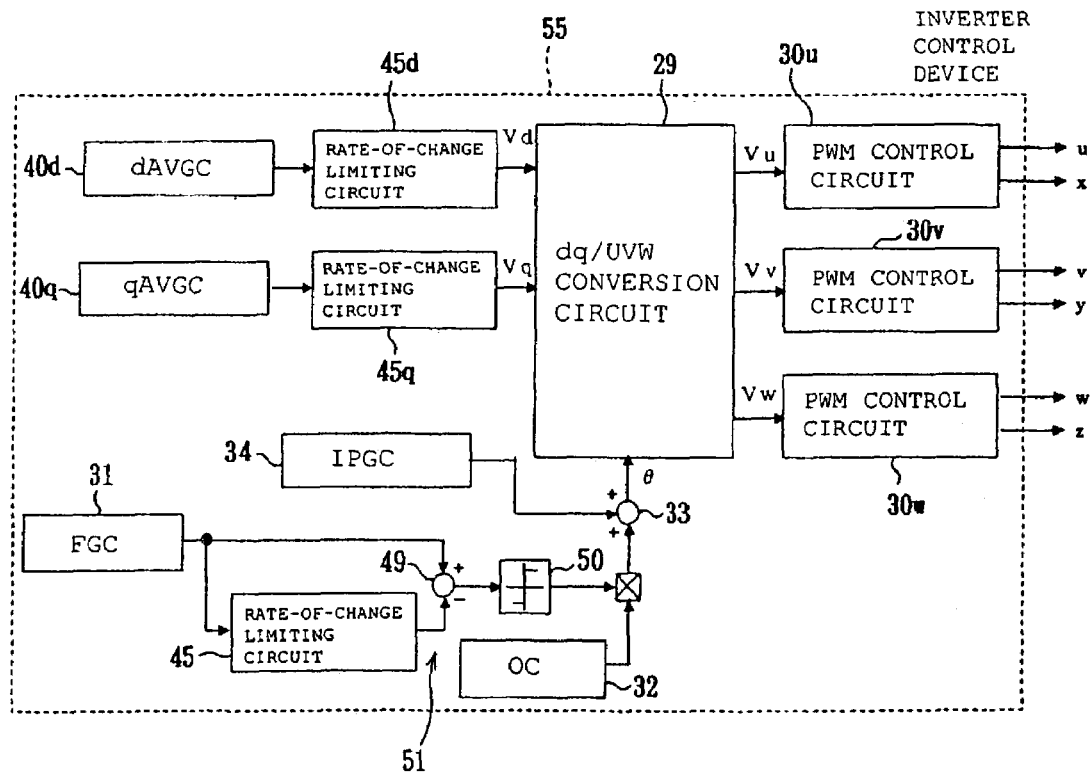
FIG. 20 is a view corresponding to FIG. 9 showing an eleventh embodiment of the present invention.

FIG. 20 shows an eleventh embodiment of the present invention. Only parts that are different from the fifth embodiment are described. In the discharge control section (control circuit) 55 of the eleventh embodiment, a frequency gradual reduction circuit 51 as in that of the seventh embodiment etc. is inserted between the frequency generating circuit 31 and oscillation circuit 32 in the discharge control section 46 of the fifth embodiment.

With the eleventh embodiment constructed as described above, the same benefits as in the case of the seventh embodiment can be obtained.

TWELFTH EMBODIMENT

Figure 21:
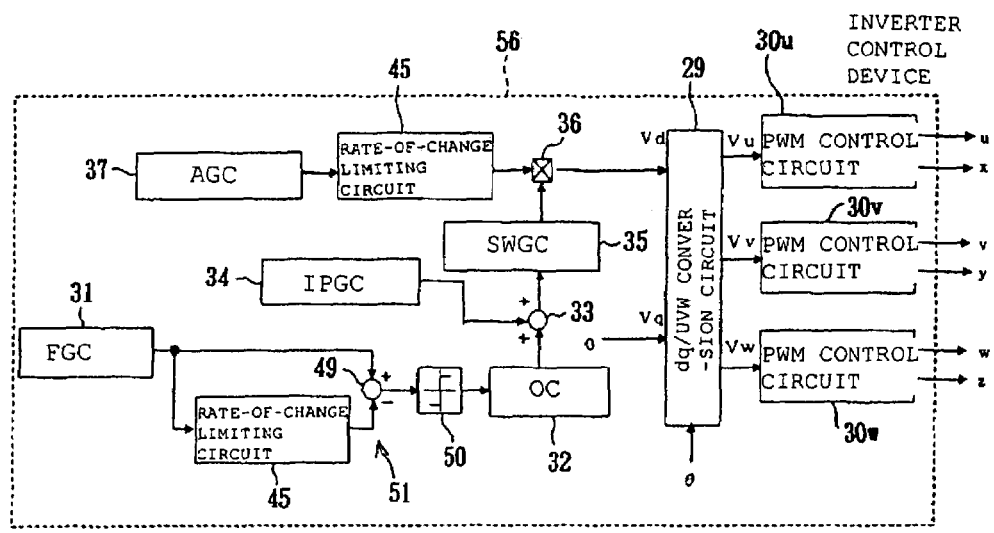
FIG. 21 is a view corresponding to FIG. 9 showing a twelfth embodiment of the present invention.

FIG. 21 shows a twelfth embodiment of the present invention. Only parts that are different from the sixth embodiment are described. In the discharge control section (control circuit) 56 of the twelfth embodiment, a frequency gradual reduction circuit 51 as in that of the seventh embodiment etc. is inserted between the frequency generating circuit 31 and oscillation circuit 32 in the discharge control section 47 of the sixth embodiment.

With the twelfth embodiment constructed as described above, the same benefits as in the case of the seventh embodiment can be obtained.

THIRTEENTH EMBODIMENT

Figure 22:
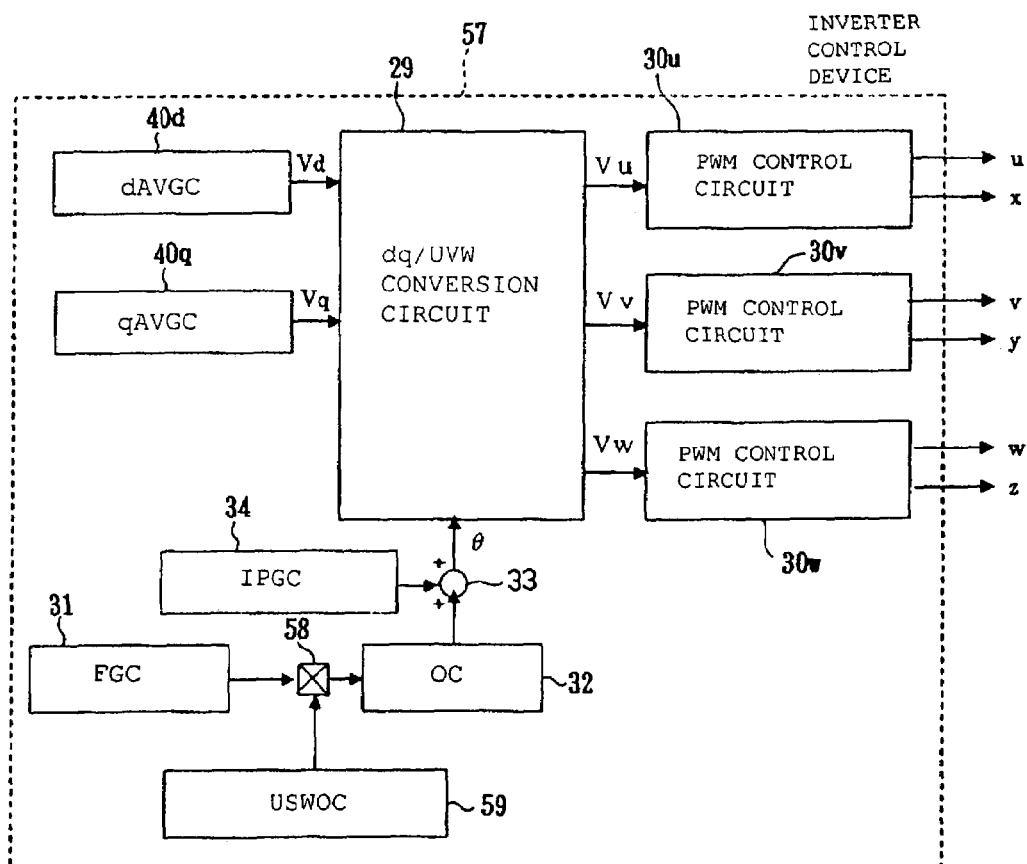
FIG. 22 is a view corresponding to FIG. 9 showing a thirteenth embodiment of the present invention.

FIG. 22 shows a thirteenth embodiment of the present invention. Only parts that are different from the second embodiment are described. In the discharge control section (control circuit) 57 of the thirteenth embodiment, a multiplier 58 is inserted between the frequency generating circuit 31 and oscillation circuit 32 in the discharge control section 43 of the third embodiment so that output data obtained by multiplying the output data of a unit square wave oscillation circuit 59 with the output data of the frequency generating circuit 31 is output to the oscillation circuit 32.

The unit square wave oscillation circuit (USWOC) 59 outputs a square wave signal whose amplitude is changed over periodically to ±1. As a result, the phase signal that is output from the oscillation circuit 32 is repeatedly increased and decreased, so the high-frequency voltages that are output to the stator windings 11$u$ to 11$w$ of the motor 9 through the dq/UVW conversion section 29, PWM control section 30 and main inverter circuit 3 generate a rotating magnetic field whose direction of rotation in the stator is alternately forwards and backwards.

With the thirteenth embodiment constructed as described above, since the discharge control section 57 applies high-frequency voltages such as to generate a rotating magnetic field whose direction changes over alternately in the stator of the motor 9, a torque whose direction changes alternately acts on the stator of the motor 9, so the average thereof is practically zero. Consequently, the output torque of the motor 9 can be suppressed to the greatest possible extent.

FOURTEENTH EMBODIMENT

Figure 23:
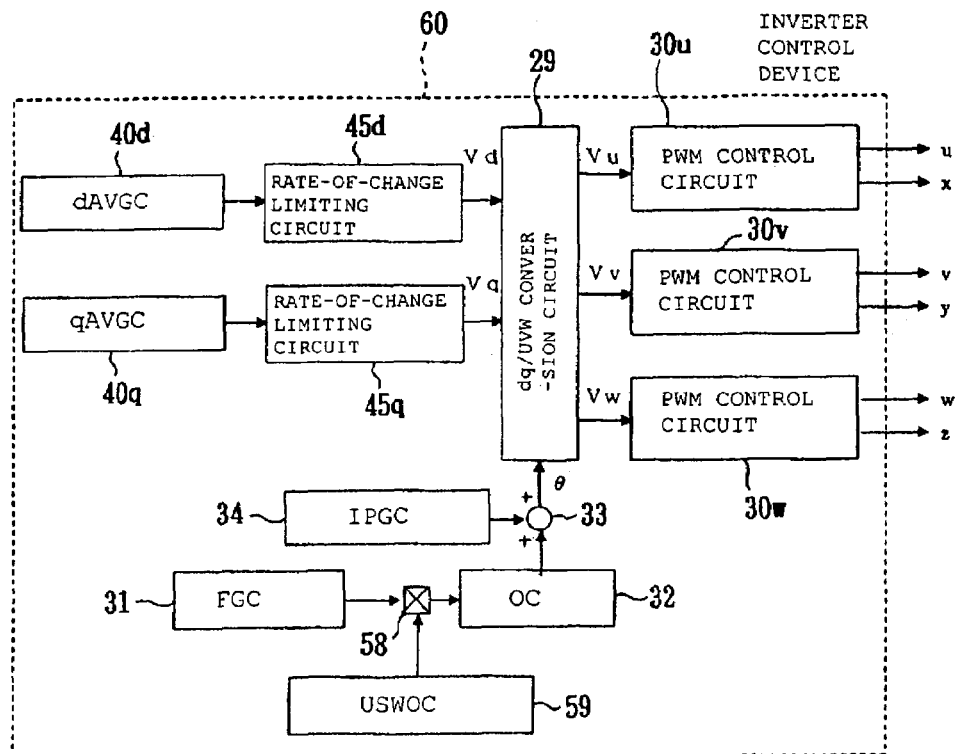
FIG. 23 is a view corresponding to FIG. 9 showing a fourteenth embodiment of the present invention.

FIG. 23 shows a fourteenth embodiment of the present invention. In the fourteenth embodiment, a discharge control section (control circuit) 60 is constituted by combining the construction of the fifth embodiment with the construction of the thirteenth embodiment. With the fourteenth embodiment constructed in this way, the benefits obtained by the fifth embodiment and the benefits obtained by the thirteenth embodiment can be obtained simultaneously.

FIFTEENTH EMBODIMENT

Figure 24:
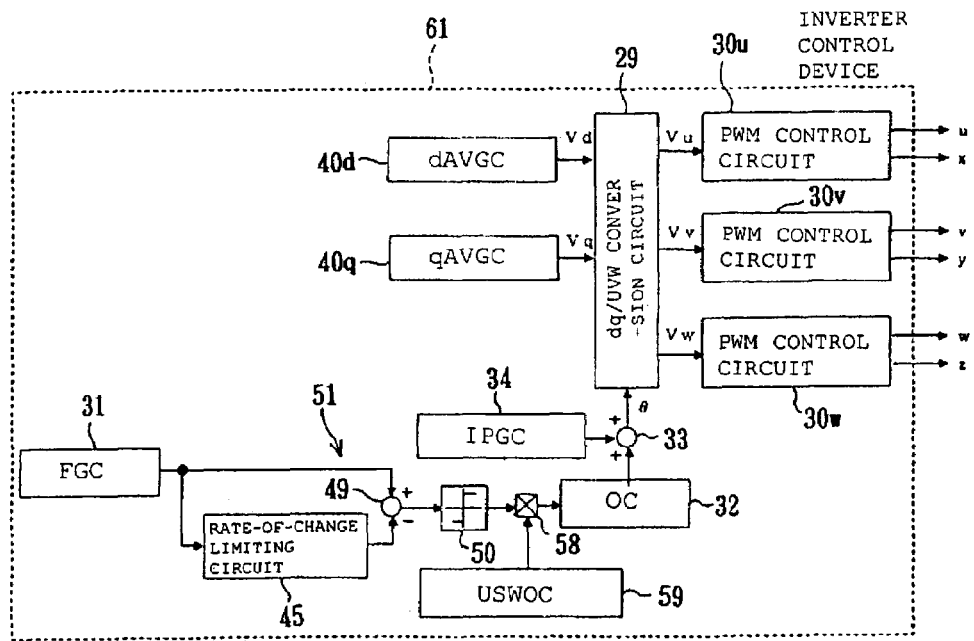
FIG. 24 is a view corresponding to FIG. 9 showing a fifteenth embodiment of the present invention.

FIG. 24 shows a fifteenth embodiment of the present invention. In the fifteenth embodiment, a discharge control section (control circuit) 61 is constituted by adding a multiplier 58 and unit square wave oscillation circuit 59 as in the thirteenth embodiment to the discharge control section 52 of the eighth embodiment. Specifically, a structural portion comprising a multiplier 58 and a unit square wave oscillation circuit 59 is inserted between the limiter 50 and the oscillation circuit 32 of the frequency gradual reduction circuit 51. With the fifteenth embodiment constructed in this way, the benefits obtained by the eighth embodiment and the benefits obtained by the thirteenth embodiment can be obtained simultaneously.

SIXTEENTH EMBODIMENT

Figure 25:
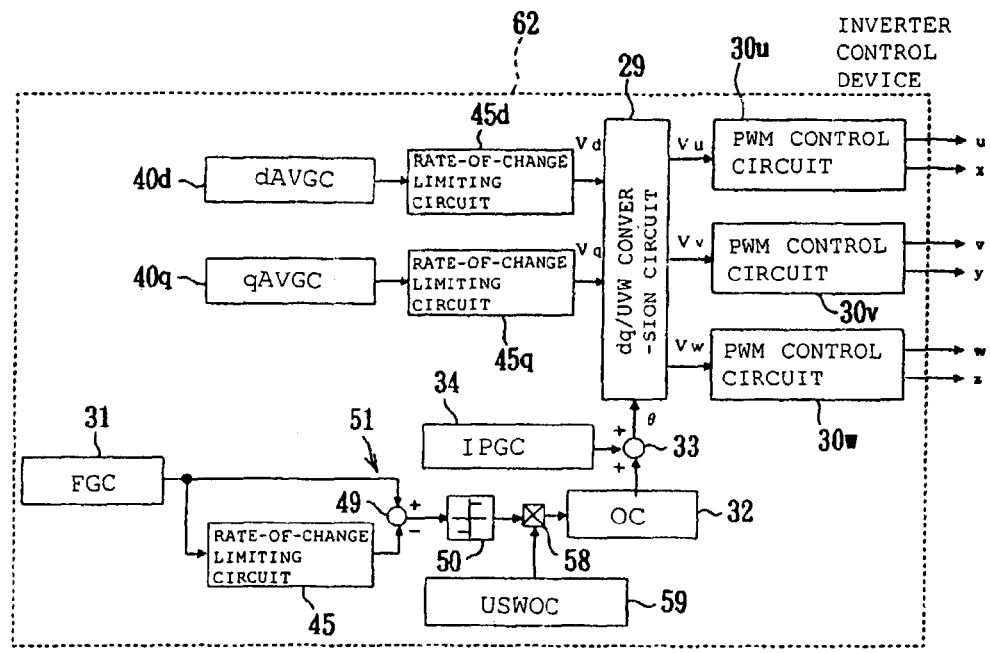
FIG. 25 is a view corresponding to FIG. 9 showing a sixteenth embodiment of the present invention.

FIG. 25 shows a sixteenth embodiment of the present invention. In the sixteenth embodiment, a discharge control section (control circuit) 62 is constituted by adding a multiplier 58 and unit square wave oscillation circuit 59 as in the fifteenth embodiment to the frequency gradual reduction circuit 51 constituting part of the discharge control section 55 of the eleventh embodiment. With the sixteenth embodiment constructed in this way, the benefits obtained by the eleventh embodiment and the benefits obtained by the thirteenth embodiment can be obtained simultaneously.

SEVENTEENTH EMBODIMENT

Figure 26:
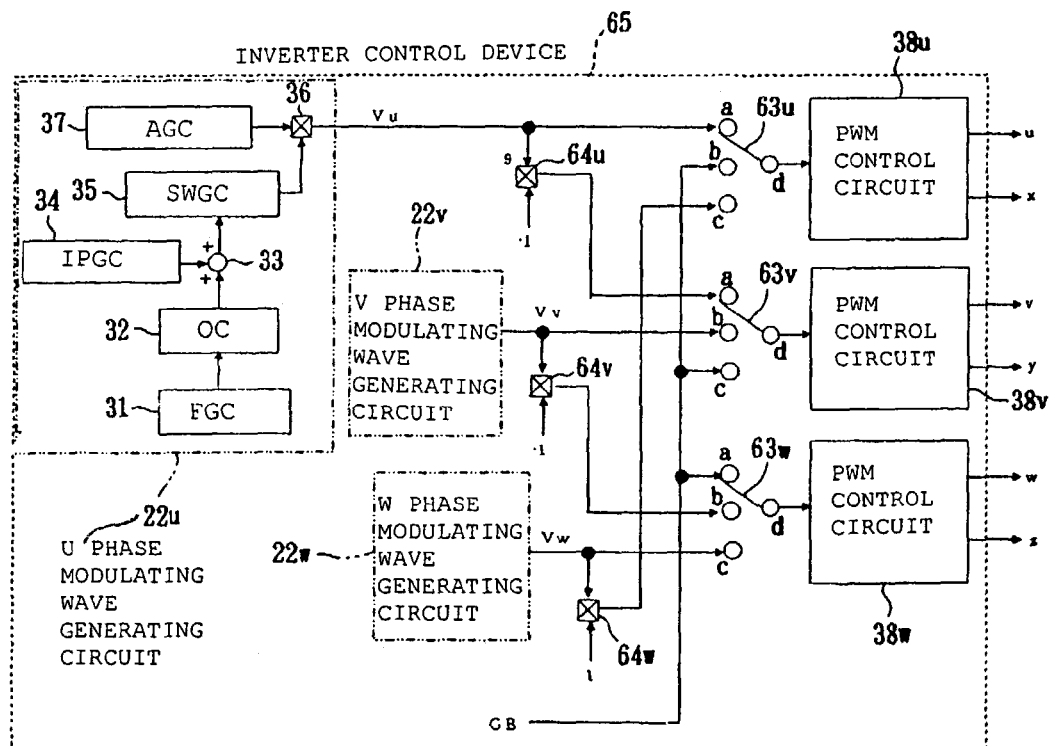
FIG. 26 is a view corresponding to FIG. 3 showing a seventeenth embodiment of the present invention.
Figure 27:
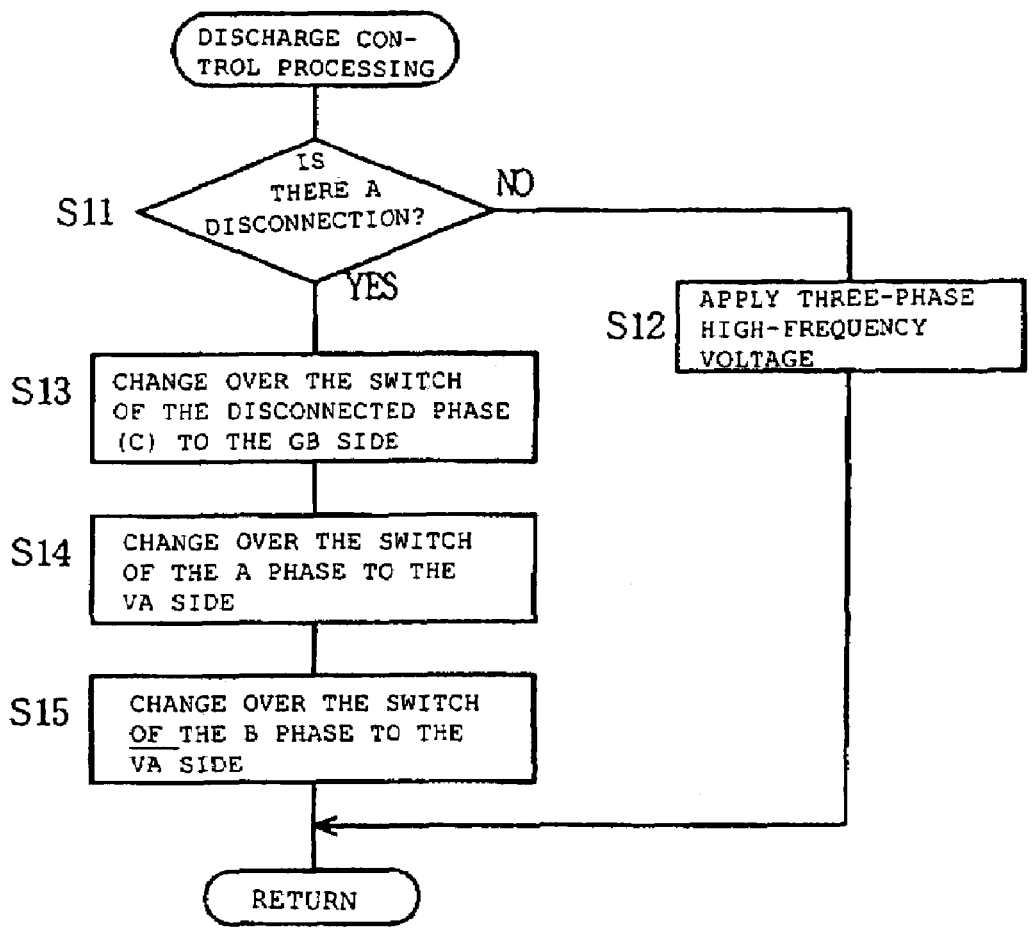
FIG. 27 is a flow chart showing the particulars of the control performed by the CPU in step S6 of FIG. 6.

FIG. 26 and FIG. 27 show a seventeenth embodiment of the present invention. In the seventeenth embodiment, the basic layout whereby the three-phase voltage instructions Vu to Vw are output during discharge is the same as in the case of the discharge control section 22 of the first embodiment. Three-point changeover switches 63$u$, 63$v$ and 63$w$ are inserted between the modulating wave generating circuits corresponding to each phase (referred to in this way in this embodiment) 22$u$, 22$v$ and 22$w$ and the PWM control circuits 38$u$, 38$v$ and 38$w$.

The output terminals of the modulating wave generating circuits 22$u$, 22$v$ and 22$w$ are respectively connected with the fixed contacts a, b and c of the switches 63$u$, 63$v$ and 63$w$. Also, gate block (GB) outputs that apply a zero instruction value are respectively connected to the fixed contacts b, c, a of the switches 63$u$, 63$v$ and 63$w$.

Also, the voltage instructions Vu, Vv and Vw that are output by the modulating wave generating circuits 22$u$, 22$v$ and 22$w$ are respectively applied to multipliers 64$u$, 64$v$ and 64$w$ where they are multiplied by a coefficient "−1", the output signal of the multiplier 64$u$ being connected with the fixed contact a of the switch 63$v$, the output signal of the multiplier 64$v$ being connected with the fixed contact b of the switch 63$w$ and the output signal of the multiplier 64$w$ being connected with the fixed contact c of the switch 63$u$, respectively. That is, multipliers 64 output the inverse phase signals of the respective phase voltage instructions V.

In addition, the moveable contacts d of the switches 63$u$, 63$v$ and 63$w$ are connected with the input terminals of the PWM control circuits 38$u$, 38$v$ and 38$w$ and changeover of the switches 63 is arranged to be performed by means of the CPU 18$a$ of the ECU 18. The above constitutes the discharge control section (control circuit) 65.

Next, the operation of the seventeenth embodiment will be described with reference also to FIG. 27. It should be noted that, in the initial condition, the moveable contacts d of the switches 63$u$, 63$v$ and 63$w$ are connected with the respective fixed contacts a, b and c.

FIG. 27 shows the particulars of the processing that is performed by the CPU 18$a$ in step S6 of the flow chart of FIG. 6 in the first embodiment. First of all, CPU 18$a$ ascertains (step S11) whether or not disconnection has occurred in the drive signal systems of the respective phase windings 11$u$ to 11$w$ of the motor 9. Specifically, disconnection of a particular phase winding is deemed to have occurred if, in normal drive control of the motor 9, the detection signal obtained by the current sensor 19 in respect of this phase has ceased to change.

In step S11, if disconnection has not occurred ("NO"), control shifts to step S12, in which the high-frequency voltage produced by the three-phase voltage instructions Vu to Vw is output in the same way as in the first embodiment. On the other hand, if disconnection has occurred ("YES"), the switch 63 corresponding to the disconnected phase C is changed over to the gate block side (step S13). The switch 63 of the A phase, which is one of the healthy phases, is then changed over to the voltage instruction $V_A$ (step S14) and the switch 63 of the B phase, which is the other healthy phase, is changed over to the multiplier 64 of the A phase ($V_A$ bar) (step S15). A, B and C are one or other of U, V and W.

For example, if the W phase is disconnected, the moveable contact d of the switches 63$u$, 63$v$ and 63$w$ is changed over so that each of these is connected to the "a" side of the fixed contacts. A voltage instruction Vu is then output to the PWM control circuit 38$u$ and the inverse phase signal thereof is output to the control circuit 38$v$, causing the signal in respect of the control circuit 38$w$ to be blocked. That is, in this case, the main inverter circuit 3 functions as a single-phase inverter, with high-frequency voltage applied only to the U and V phases, so the motor 9 cannot rotate.

As described above, with the seventeenth embodiment, the discharge control section 65 applies high-frequency voltage to only two phases of the stator windings 11u to 11w of the motor 9, so, even in a case where a winding 11 or signal lead relating to any one of the three phases is disconnected, the smoothing capacitor 6 may be discharged by passing current to the remaining two phases.

EIGHTEENTH EMBODIMENT

Figure 28:
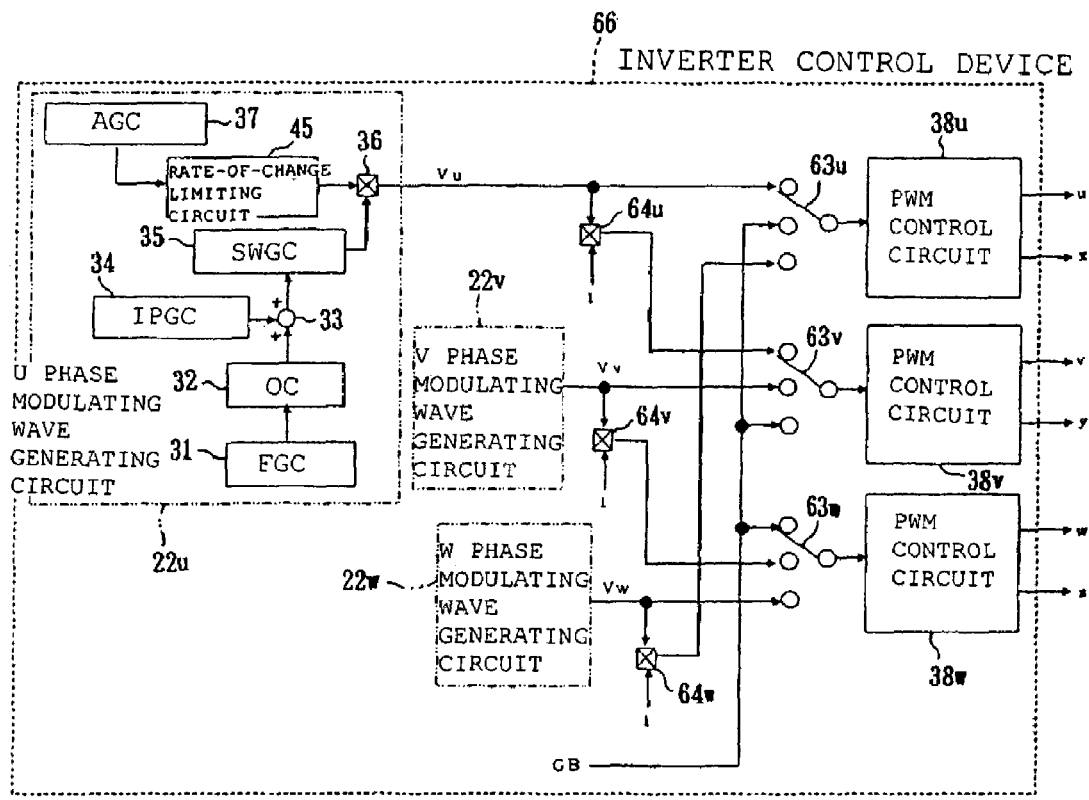
FIG. 28 is a view corresponding to FIG. 3 showing an eighteenth embodiment of the present invention.

FIG. 28 shows an eighteenth embodiment of the present invention. In the eighteenth embodiment, a discharge control section (control circuit) 66 is constituted by inserting the rate-of-change limiting circuit 45 according to the fourth embodiment between the amplitude generating circuit 37 and multiplier 36 in the modulating wave generating circuit 22 of the seventeenth embodiment. That is, the eighteenth embodiment is constituted by combining the fourth embodiment and the seventeenth embodiment. With the eighteenth embodiment constituted in this way, the benefits obtained by the fourth embodiment and seventeenth embodiment can be obtained simultaneously.

NINETEENTH EMBODIMENT

Figure 29:
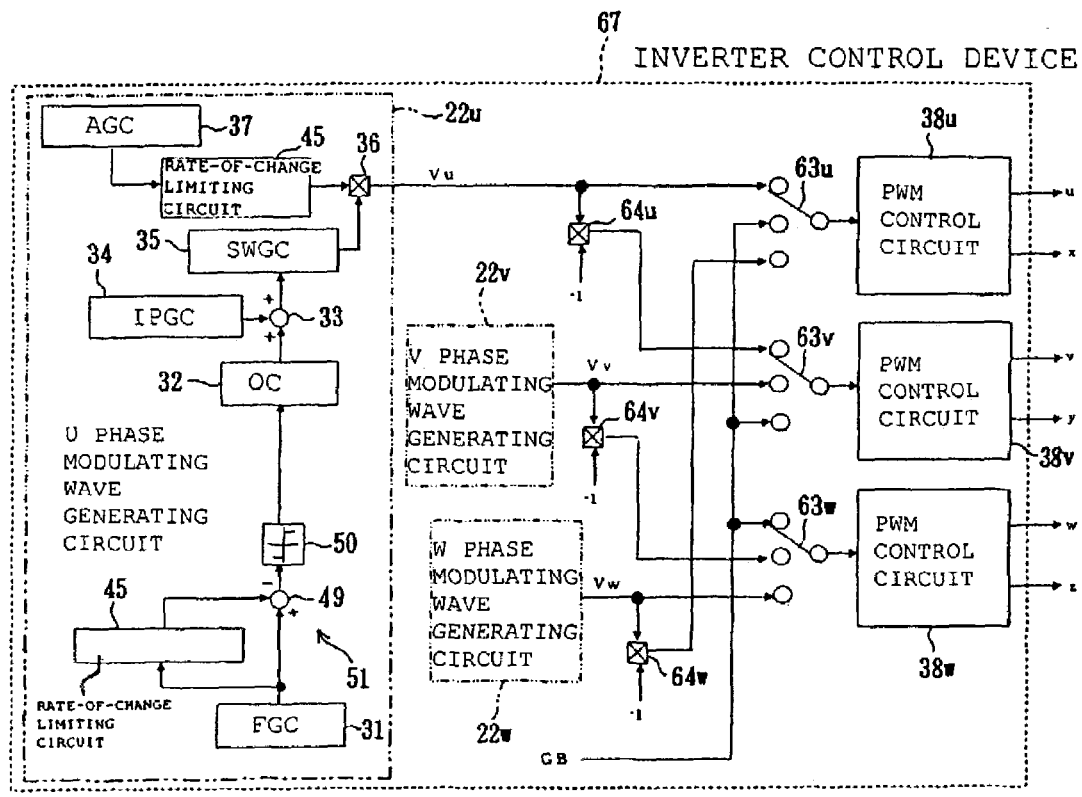
FIG. 29 is a view corresponding to FIG. 3 showing a nineteenth embodiment of the present invention.

FIG. 29 shows a nineteenth embodiment of the present invention. The discharge control section (control circuit) 67 of the nineteenth embodiment is constituted by combining the seventh embodiment and the seventeenth embodiment. With the nineteenth embodiment constituted in this way, the benefits obtained by the seventh embodiment and the seventeenth embodiment can be obtained simultaneously.

TWENTIETH EMBODIMENT

Figure 30:
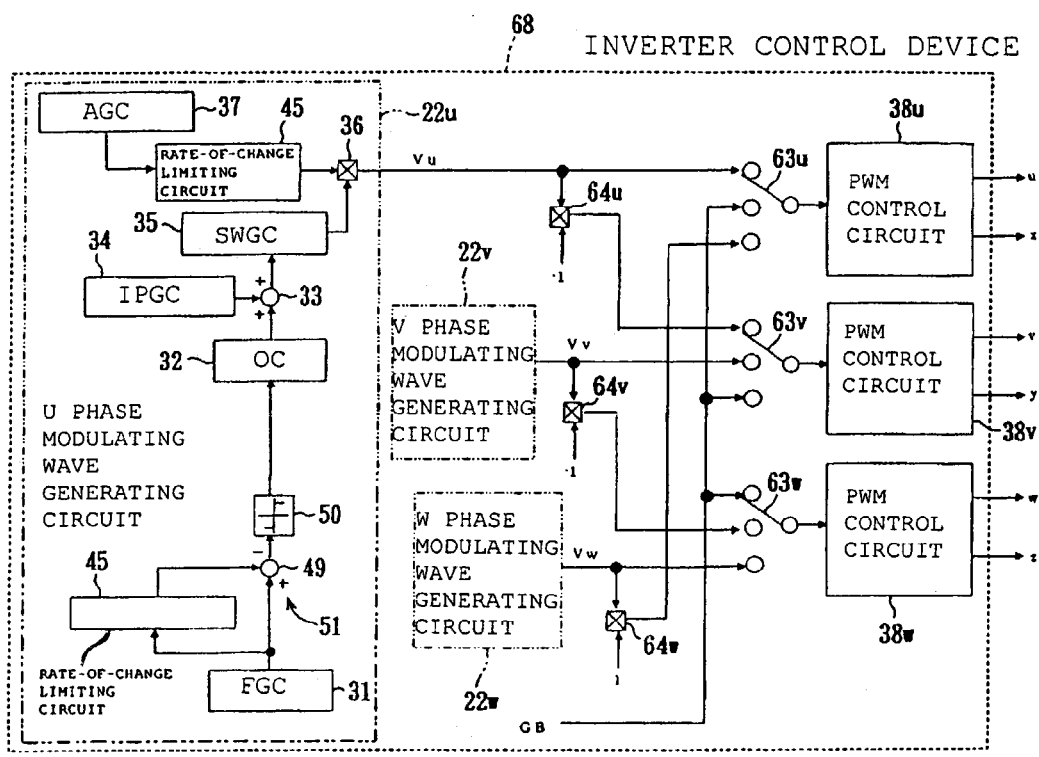
FIG. 30 is a view corresponding to FIG. 3 showing a twentieth embodiment of the present invention.

FIG. 30 shows a twentieth embodiment of the present invention. The discharge control section (control circuit) 68 of the twentieth embodiment is constituted by combining the twelfth embodiment and the seventeenth embodiment. With the twentieth embodiment constituted in this way, the benefits obtained by the twelfth embodiment and the seventeenth embodiment may be obtained simultaneously.

TWENTY-FIRST EMBODIMENT

Figure 31:
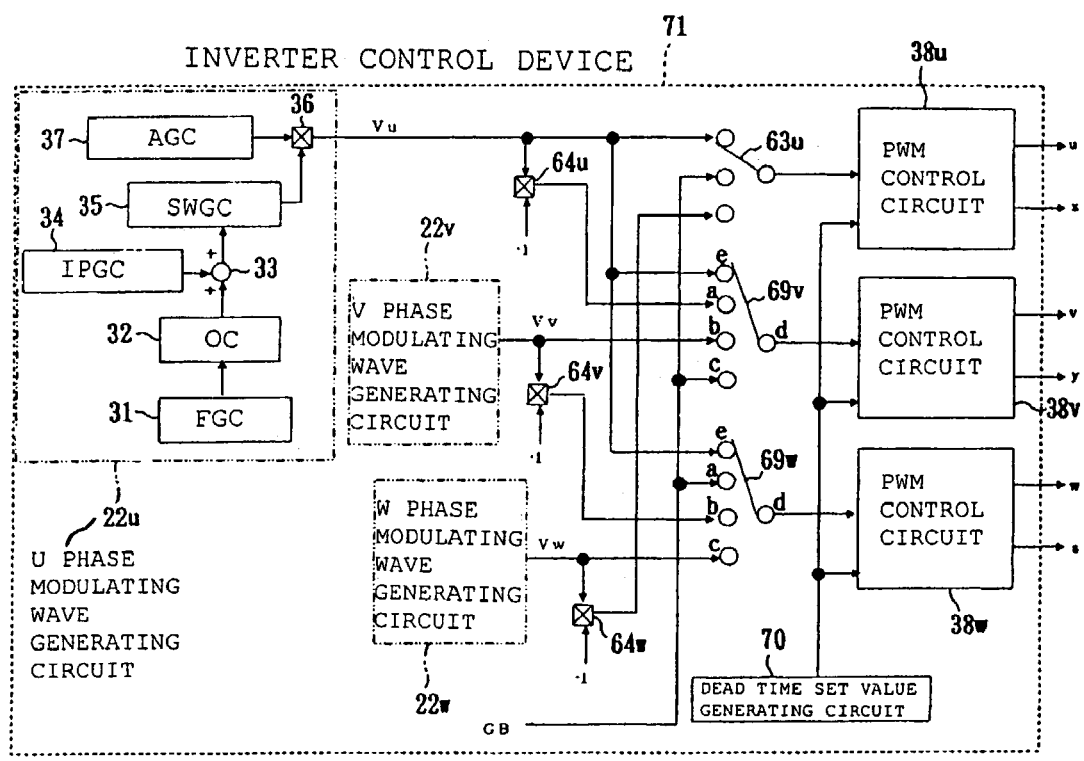
FIG. 31 is a view corresponding to FIG. 3 showing a twenty-first embodiment of the present invention.
Figure 32:
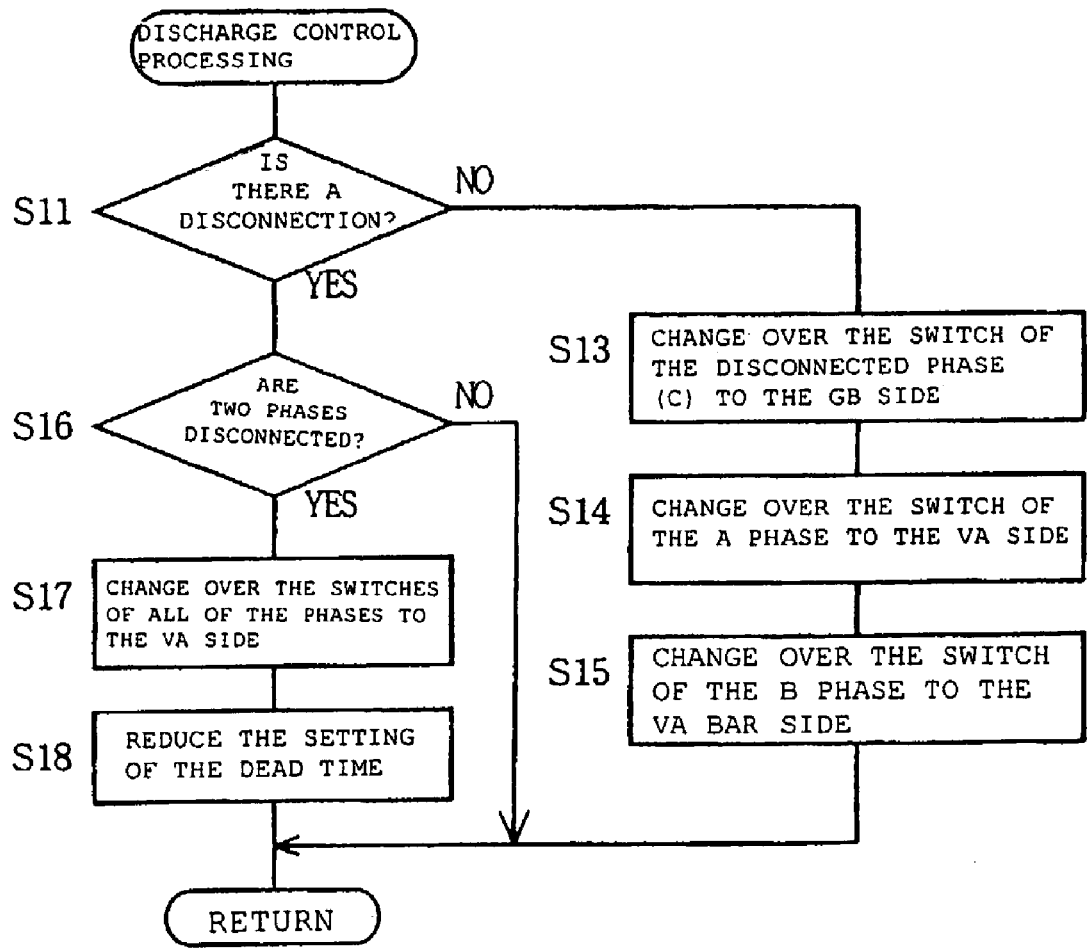
FIG. 32 is a flow chart showing the particulars of the control performed by the CPU.

FIG. 31 to FIG. 33 show a twenty-first embodiment of the present invention. The twenty-first embodiment is a development of the construction of the seventeenth embodiment. Specifically, the three-point changeover switches 63v, 63w are replaced by four-point changeover switches 69v, 69w, but the connection of their contacts a to d is the same as that of switches 63v, 63w. The fourth, fixed contact e of the switches 69v, 69w is connected with the output terminal of the modulating wave generating circuit 22u.

Also, the dead time that is applied in ON/OFF changeover of the IGBTs 7 of the upper and lower arms of the main inverter circuit 3 is set by a dead time generating circuit 70. As shown in FIG. 33, the dead time Td is set as a period in which both of the IGBTs 7 of the upper arm and the lower arm are simultaneously OFF, in order to prevent short-circuit current flowing if these IGBTs 7 are simultaneously turned ON. The dead time generating circuit 70 is constructed such that the setting of this dead time can be altered in accordance with an instruction from the CPU 18a. The discharge control section (control circuit) 71 is constituted by the above elements.

FIG. 32 is a flow chart showing the particulars of the control performed by the CPU 18a. When the CPU 18a makes an evaluation "YES" in step S11 by detecting disconnection, it ascertains whether or not this disconnection has occurred in respect of two phases of the three phases (step S16). If only one phase is disconnected ("NO"), it executes steps S13 to S15 in the same way as in the seventeenth embodiment. If two phases (B, C) are disconnected ("YES"), it changes over the switches 63u, 69v and 69w of all of the phases to the voltage instruction $V_A$ (step S17). After this, it sets the dead time in the dead time generating circuit 70 so as to be smaller than the dead time in normal control operation (step S18). For example, if the setting during normal control operation is 6 μsec, this setting is reduced to about 1 μsec.

Specifically, a few time is required after the gate voltage of an IGBT 7 is applied before it turns ON or after the gate voltage has ceased be applied before it turns OFF. If therefore the turn-off time is made short, a minute short-circuiting current flows between these two by for example overlapping of the turn-off period of the upper arm and the turn-on period of the lower arm. Consequently, if disconnection occurs in two phases of the three phases, if the same voltage instruction is output to all the three phases as in the case where these phases are healthy, the accumulated charge of the smoothing capacitor 6 can be discharged by this short-circuiting current.

It should be noted that this embodiment does not envisage the case where all three phases are disconnected. Also, although, for convenience in illustration, the layout is shown assuming that disconnection has occurred in the V and W phases, it would of course be possible to cope with disconnection of any two phases by increasing the number of changeover points of the changeover switches.

As described above, with the twenty-first embodiment, when discharging of the smoothing capacitor 6 is performed, if disconnection of two phases of the three phases has occurred, the discharge control section 71 is arranged to reduce the set value of the dead time such that a minute short-circuiting current flows during ON/OFF changeover of the upper arm and lower arm of the main inverter circuit 3 in respect of all three phases, so discharging of the smoothing capacitor 6 may be performed by means of this short-circuiting current.

TWENTY-SECOND EMBODIMENT

FIG. 34 shows a twenty-second embodiment of the present invention. In the twenty-second embodiment, a carrier frequency setting circuit 72 is added to the PWM generating circuit 38 of for example the first embodiment. The carrier frequency setting circuit 72 is constituted such that the frequency setting of the carrier wave signal (carrier) employed for PWM control may be altered by an instruction from the CPU 18a. The discharge control section (control circuit) 73 is constituted by the above elements. Also, the CPU 18a exercises control such as to increase the carrier frequency when discharge control of the smoothing capacitor 6 is performed.

Specifically, if the carrier frequency is raised, the switching loss is raised, since the number of times that switching is performed by the IGBTs 7 constituting the main inverter circuit 3 is increased. More of the accumulated charge of the smoothing capacitor 6 is therefore dissipated corresponding to this increased loss, so discharge may be performed more rapidly.

TWENTY-THIRD EMBODIMENT

Figure 35:
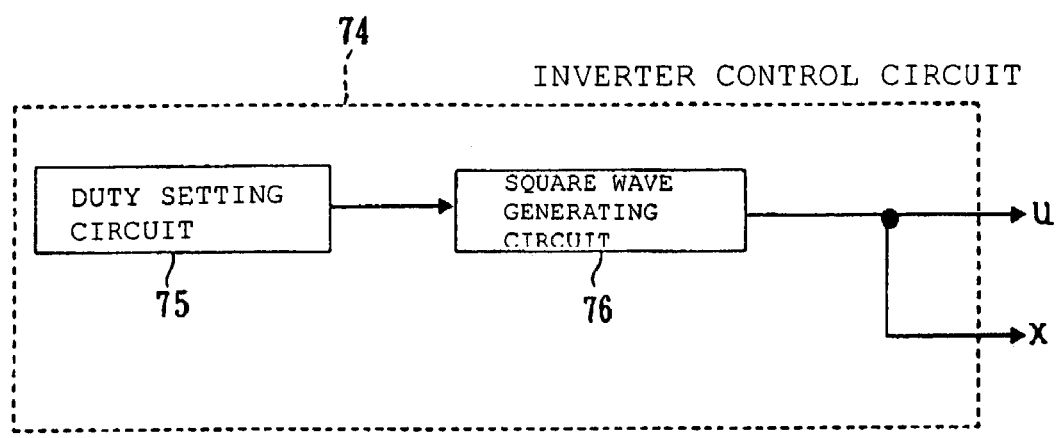
FIG. 35 is a view corresponding to FIG. 3 showing a twenty-third embodiment of the present invention.

FIG. 35 shows a twenty-third embodiment of the present invention. The discharge control section (control circuit) 74 of the twenty-third embodiment (only U phase shown) is constituted by a duty setting circuit 75 and square wave generating circuit 76. The output signals of the square wave generating circuit 76 are common to the u gate and x gate.

Specifically, common gate signals are applied to the upper arm and the lower arm, so both of these are simultaneously turned ON in the main inverter circuit 3, causing a short-circuiting current to flow. The duty setting circuit 75 sets the ON duty (ON time Ton) of the IGBTs 7. Assuming that the DC voltage of the battery 1 is Vdc, the stray inductance of the DC buses 4, 5 of the main inverter circuit 3 is Ls and the permitted current of the IGBTs 7 is Imax, the ON time Ton is set so as to be smaller than the value determined by the expression (5).

$$Ton = Ls/Vdc * Imax \quad (5)$$

If the ON time Ton is set in this way, even though a short-circuiting current flows, the IGBTs 7 will not be destroyed.

With the twenty-third embodiment constructed as above, the discharge control section 74 is arranged so as to discharge the charge accumulated on the smoothing capacitor 6 by allowing a short-circuiting current to flow between the upper arm and lower arm by simultaneously turning all of the IGBTs 7 constituting the main inverter circuit 3 ON when the connection between the battery 1 and the smoothing capacitor 6 is disconnected by the contactor 2. Consequently, in the same way as in the case of the twenty-second embodiment etc., discharge of the smoothing capacitor 6 may be achieved irrespective of which phase of the three phases has become disconnected.

TWENTY-FOURTH EMBODIMENT

Figure 36:
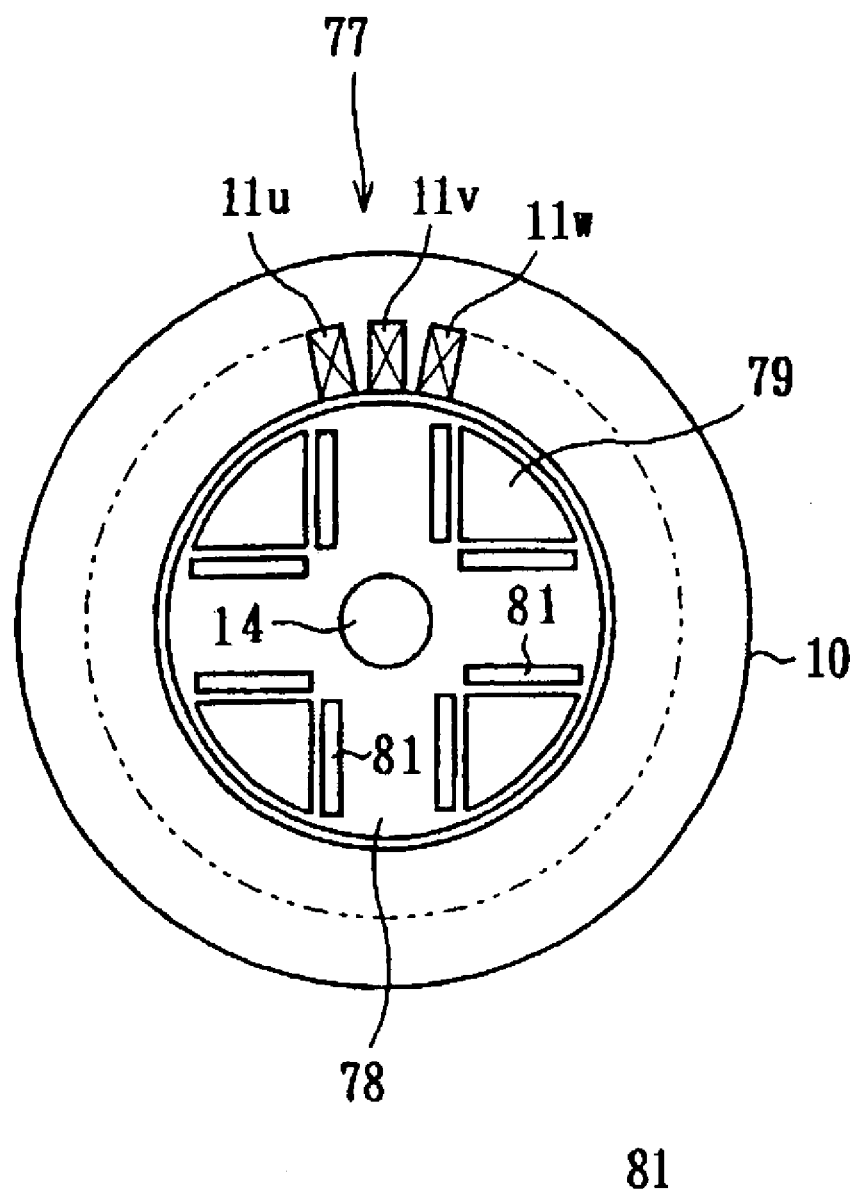
FIG. 36 is a view corresponding to FIG. 5 showing a twenty-fourth embodiment of the present invention.

FIG. 36 shows a twenty-fourth embodiment of the present invention. The twenty-fourth embodiment is arranged to employ a permanent magnet reluctance motor 77 instead of (employing) the motor 9. The permanent magnet reluctance motor 77 is constructed as an embedded type like the motor 9 but fan-shaped punched-out sections (sector-shaped punched-out sections) 79 are formed at four locations at the periphery of the rotor core 78. Two slots are formed along the straight-line portions of each of these punched-out sections 79, making a total of eight slots. Permanent magnets 81 are arranged in the slots.

In the permanent magnet reluctance motor 77 constructed as in this embodiment, the permanent magnets 81 act as magnetic flux barriers, so more of the field flux passes through the iron portions of the core. As a result, the permanent magnet motor 77 has the property that the reluctance torque becomes larger than the torque generated by the permanent magnets 81 and the core loss is larger than in the case of the motor 9. Consequently, by employing a permanent magnet motor 77, discharge may be completed with the accumulated charge of the smoothing capacitor 6 being dissipated more rapidly, corresponding to the increased core loss.

TWENTY-FIFTH EMBODIMENT

Figure 37:
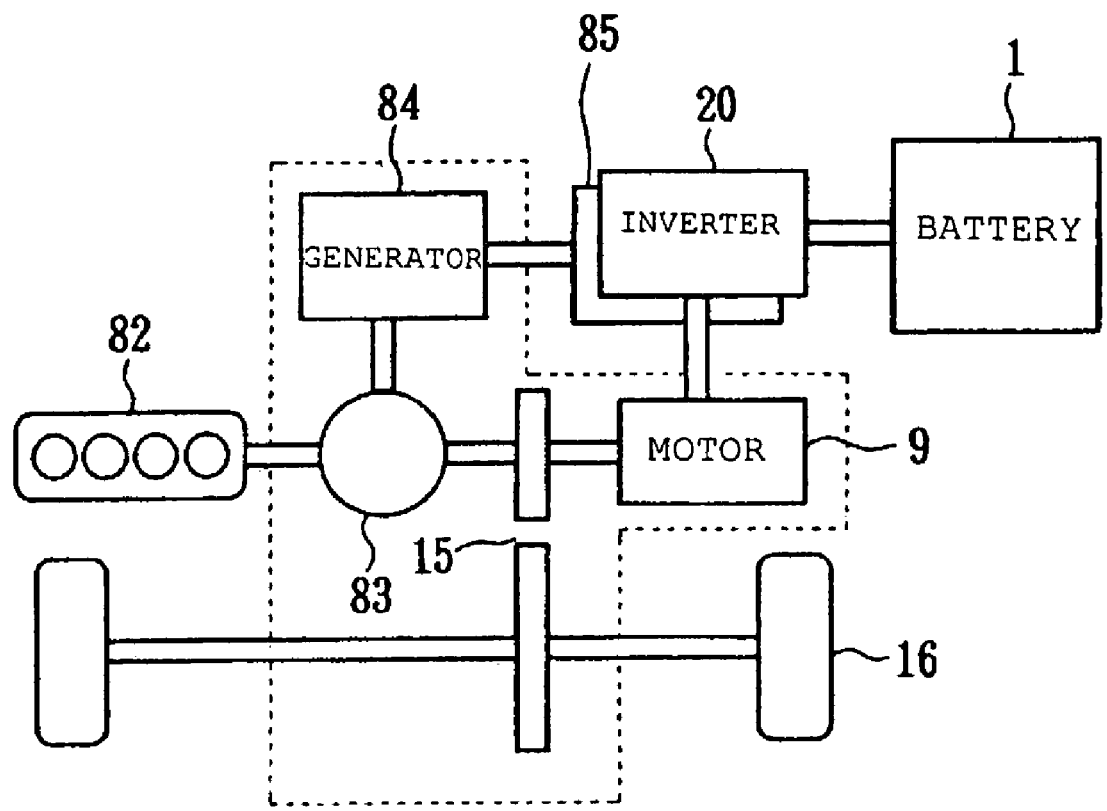
FIG. 37 is a view showing diagrammatically the drive system of an electric vehicle of the hybrid type according to a twenty-fifth embodiment of present invention.
Figure 38:
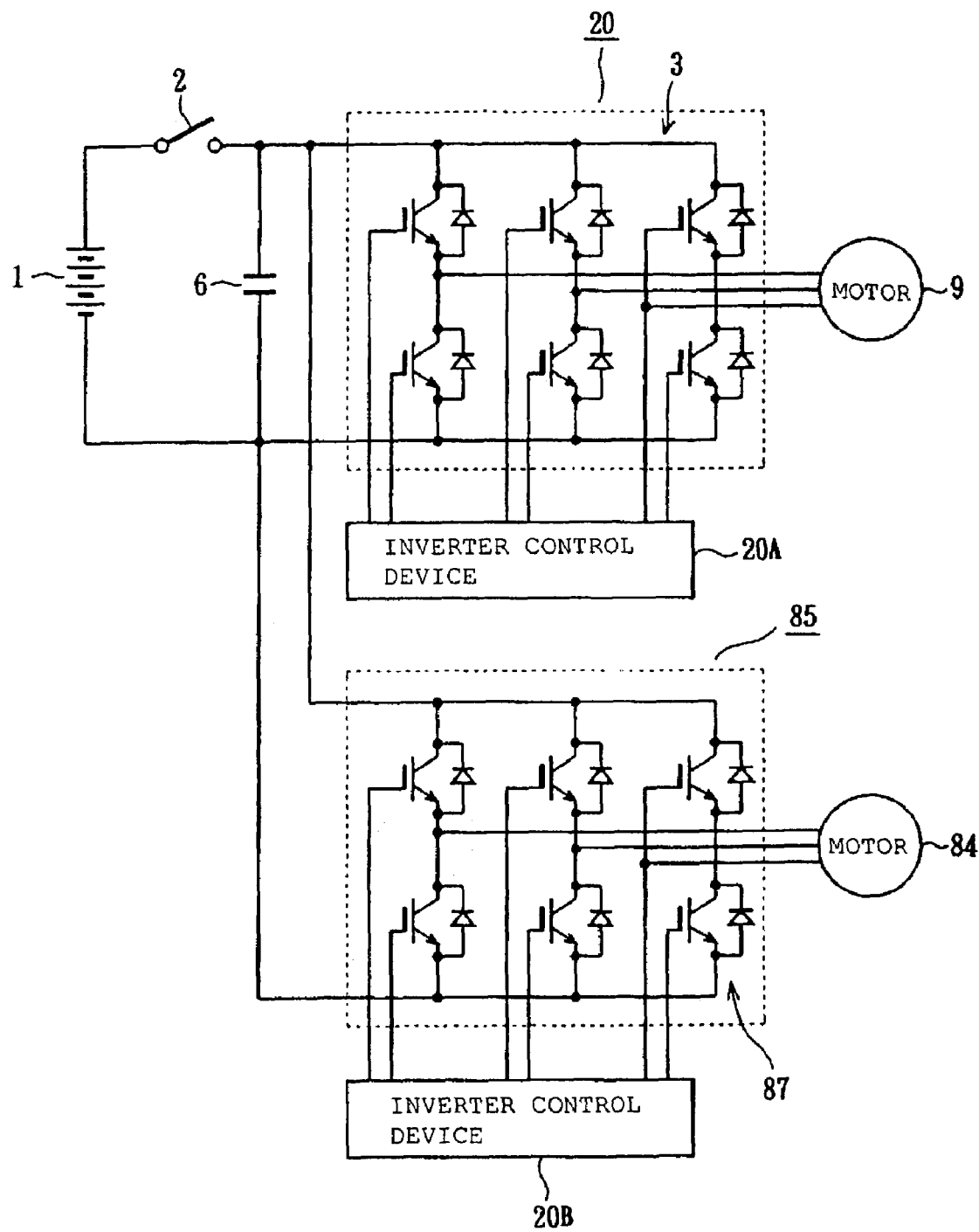
FIG. 38 is a view corresponding to FIG. 1.

FIG. 27 and FIG. 38 show a twenty-fifth embodiment of the present invention. In the twenty-fifth embodiment, the present invention is applied to a hybrid type electric vehicle (HEV) incorporating a gasoline engine. FIG. 37 shows a diagram of the drive system of the HEV. For convenience in description, items which are basically of the same construction as in the first embodiment are given the same reference symbols.

As in the first embodiment, the HEV comprises a battery 1, inverter 20, motor 9, reduction gear 15 and wheels 16 and further comprises an engine 82, a power dividing mechanism 83 including a planetary gear (epicyclical gear) etc. and a generator 84. The power dividing mechanism 83 transmits the drive force of the engine 82 to the wheels 16 through the reduction gear 15 or transmits the drive force of the engine 82 to the generator 84. Also, the power generated by the generator 84 is regenerated to the battery through the PWM converter (inverter) 85.

FIG. 38 is a view corresponding to FIG. 1. In the case of an HEV constructed as described above, there are two drive systems comprising a main inverter circuit 3 and motor 9, the main circuit 87 of PWM converter 85 and generator 84 in respect of a single battery 1 and smoothing capacitor 6. These are respectively provided with control devices 20A, 20B for performing drive control.

When the contactor 2 is open so that discharging of the smoothing capacitor 6 is being performed, the generator 84 is not in a condition in which it functions as a generator. The same operation as in the case of the first embodiment may therefore be performed by using the main PWM converter circuit 87 as the main inverter circuit and using the generator 84 as a motor, so discharge of the smoothing capacitor 6 may be completed more rapidly by operating these two systems in parallel.

The present invention is not restricted solely to the embodiment described above and depicted in the drawings and modifications or developments are possible as described below.

The invention may also be applied to vector control of the sensor-less type in which rotary position is estimated by motor characteristics with the motor current, and current detection is performed for example by means of a shunt resistance, instead of using a current sensor 19.

The construction of the first embodiment may also be applied in the same way even if the normal drive control is not vector control.

For example, in the second embodiment, Vq could be set to a prescribed value which is not zero. Also, taking Vd=0, Vq could be set to a prescribed value.

An initial phase generating circuit 34 could be provided if required.

The characteristic of the rate-of-change limiting circuit 45 is not restricted solely to monotonic increase and a characteristic could be adopted that increases non-linearly or repeated increase/decrease could be performed.

The dead time in the twenty-first embodiment may be set to zero.

The twenty-first embodiment may be performed concurrently with the first to twentieth embodiments and if this is done the discharge of the smoothing capacitor 6 may be performed even more rapidly.

When applied to an electric vehicle, the motor is not restricted to the motor used for driving the vehicle but could be applied to a system for controlling a motor employed in another drive section such as for example the compressor motor or the fan motor of an air conditioner. And condenser discharge could be effected with three or more control systems operated in parallel.

Also, the invention is not restricted to electric vehicles but could be widely applied in cases where a capacitor for DC power source smoothing is isolated from the power source and must be discharged.

The switching means is not restricted to a contactor 2 and a relay or the like could be employed.

The motor is not restricted to an embedded type permanent magnet motor and a typical DC brushless motor or inductive motor etc. could be employed.

[Benefit of the Invention]

With an inverter control device according to the present invention, when the connection of the battery and the capacitor is disconnected by the switching means, the control circuit discharges the charge accumulated on the capacitor by applying a high-frequency voltage to the stator winding of the motor by controlling the main inverter circuit, so the charge accumulated on the capacitor may be discharged and dissipated by core loss and/or copper loss generated in the motor without rotating motor and without employing a sensor or the like for detecting the rotary condition of the motor.

With an inverter control device according to the present invention, when the connection between the battery and the capacitor is disconnected by the switching means, the control circuit discharges the charge accumulated on the capacitor by effecting switching such that a minute short-circuiting current flows while ON/OFF changeover of the upper arm and lower arm of the main inverter circuit is being effected, so, in the same way as described above, discharge of the capacitor may be achieved without employing a sensor or the like to detect the rotary condition of the motor and without rotating the motor.

With an inverter control device according to the present invention, when the connection between the battery and the capacitor is disconnected by the switching means, the control circuit discharges the charge accumulated on the capacitor by allowing a short-circuiting current to flow between the upper arm and the lower arm by simultaneously turning all of the switching elements constituting the main inverter circuit ON, so, in the same way as described above, discharge of the capacitor may be achieved without employing a sensor or the like to detect the rotary condition of the motor and without rotating the motor.

With an electric vehicle according to the present invention, an inverter and control device are provided in the construction, so the charge accumulated on the capacitor may be discharged by utilizing the various motors that are employed in each section.

What is claimed is:

1. An inverter control device, comprising:
a capacitor smoothing a DC power source voltage that is output from a battery;
a main inverter circuit driving a motor by converting a DC power smoothed by said capacitor into a three-phase AC power;
a switch configured to open and close a connection of said battery and said capacitor; and
a control circuit discharging a charge accumulated on said capacitor when said connection between said battery and said capacitor is disconnected by said switch, by controlling said main inverter circuit to apply a high-frequency voltage to a stator winding of said motor.

2. The inverter control device according to claim 1,
wherein said motor is arranged to be vector-controlled during normal drive, and
said control circuit applies said high-frequency voltage by setting a q axis voltage instruction value and a d axis voltage instruction value to respectively arbitrary values.

3. The inverter control device according to claim 1,
wherein said motor is arranged to be vector-controlled during normal drive, and
said control circuit applies said high-frequency voltage by setting either of a q axis voltage instruction value and a d axis voltage instruction value to zero.

4. The inverter control device according to claim 1,
wherein said control circuit applies high-frequency voltage so as to generate an alternating magnetic field in a stator of said motor.

5. The inverter control device according to claim 1,
wherein said control circuit applies a high-frequency voltage so as to generate a rotating magnetic field that changes over alternately in direction in a stator of said motor.

6. The inverter control device according to claim 1,
wherein said control circuit applies said high-frequency voltage to only two phases of said stator windings of said motor.

7. The inverter control device according to claim 1,
wherein said control circuit changes an amplitude of said high-frequency voltage after commencement of application to said stator windings of said motor.

8. The inverter control device according to claim 1,
wherein said control circuit changes a frequency of said high-frequency voltage after commencement of application to said stator windings of said motor.

9. The inverter control device according to claim 1,
wherein said control circuit adjusts a timing of switching so that a minute short-circuiting current flows during ON/OFF changeover of an upper arm and lower arm of said main inverter circuit when said high-frequency voltage is applied.

10. The inverter control device according to claim 1,
wherein said main inverter circuit is constituted so as to be PWM-controlled, and
said control circuit increases a carrier wave frequency of a PWM control compared to said carrier wave frequency during normal operation when a connection of said battery and said capacitor is disconnected by said switch.

11. An inverter control device, comprising:
a capacitor smoothing a DC power source voltage that is output from a battery;
a main inverter circuit driving a motor by converting a DC power smoothed by said capacitor into a three-phase AC power;
a switch configured to open and close a connection of said battery and said capacitor; and
a control circuit discharging a charge accumulated on said capacitor when said connection between said battery and said capacitor is disconnected by said switch, by performing switching so that a minute short-circuiting current flows during ON/OFF changeover of an upper arm and lower arm of said main inverter circuit.

12. An inverter control device, comprising:
a capacitor smoothing a DC power source voltage that is output from a battery;
a main inverter circuit driving a motor by converting a DC power smoothed by said capacitor into a three-phase AC power;
a switch configured to open and close a connection of said battery and said capacitor;

a control circuit for discharging a charge accumulated on said capacitor when said connection between said battery and said capacitor is disconnected by said switch, by allowing a short-circuiting current to flow between an upper arm and lower arm by simultaneously turning ON all switching elements constituting said main inverter circuit.

13. The inverter control device according to claim 1, wherein said motor is an embedded type permanent magnet motor.

14. The inverter control device according to claim 13, wherein said motor is constituted so that a reluctance torque is larger than a torque generated by a permanent magnet.

15. An electric vehicle incorporating an inverter control device, said inverter control device comprising:
   (a) a capacitor smoothing a DC power source voltage that is output from a battery;
   (b) a main inverter circuit driving a motor by converting a DC power smoothed by said capacitor into a three-phase AC power;
   (c) a switch configured to open and close a connection of said battery and said capacitor; and
   (d) a control circuit discharging a charge accumulated on said capacitor when said connection between said battery and said capacitor is disconnected by said switch, by controlling said main inverter circuit to apply a high-frequency voltage to a stator winding of said motor.

16. An electric vehicle incorporating an inverter control device, said inverter control device comprising:
   (a) a capacitor smoothing a DC power source voltage that is output from a battery;
   (b) a main inverter circuit driving a motor by converting a DC power smoothed by said capacitor into a three-phase AC power;
   (c) a switch configured to open and close a connection of said battery and said capacitor; and
   (d) a control circuit for discharging a charge accumulated on said capacitor when said connection between said battery and said capacitor is disconnected by said switch, by performing switching so that a minute short-circuiting current flows during ON/OFF changeover of an upper arm and lower arm of said main inverter circuit.

17. An electric vehicle incorporating an inverter control device, said inverter control device comprising:
   (a) a capacitor smoothing a DC power source voltage that is output from a battery;
   (b) a main inverter circuit driving a motor by converting a DC power smoothed by said capacitor into a three-phase AC power;
   (c) a switch configured to open and close a connection of said battery and said capacitor; and
   (d) a control circuit discharging a charge accumulated on said capacitor when said connection between said battery and said capacitor is disconnected by said switch, by allowing a short-circuiting current to flow between an upper arm and lower arm by simultaneously turning ON all switching elements constituting said main inverter circuit.

18. An electric vehicle according to claim 15, further comprising:
   a plurality of motors; and
   a plurality of main inverter circuits that respectively drive said plurality of motors,
   wherein said control circuit controls two or more of said plurality of main inverter circuits in parallel during capacitor discharge.

19. The inverter control device according to claim 2, wherein said control circuit applies a high-frequency voltage so as to generate a rotating magnetic field that changes over alternately in direction in a stator of said motor.

20. The inverter control device according to claim 3, wherein said control circuit applies a high-frequency voltage so as to generate a rotating magnetic field that changes over alternately in direction in a stator of said motor.

21. The inverter control device according to claim 11, wherein said motor is an embedded type permanent magnet motor.

22. The inverter control device according to claim 12, wherein said motor is an embedded type permanent magnet motor.

23. An electric vehicle according to claim 16, further comprising:
   a plurality of motors; and
   a plurality of main inverter circuits that respectively drive said plurality of motors,
   wherein said control circuit controls two or more of said plurality of main inverter circuits in parallel during capacitor discharge.

24. An electric vehicle according to claim 17, further comprising:
   a plurality of motors; and
   a plurality of main inverter circuits that respectively drive said plurality of motors,
   wherein said control circuit controls two or more of said plurality of main inverter circuits in parallel during capacitor discharge.

25. The inverter control device according to claim 21, wherein said motor is constituted so that a reluctance torque is larger than a torque generated by a permanent magnet.

26. The inverter control device according to claim 22, wherein said motor is constituted so that a reluctance torque is larger than a torque generated by a permanent magnet.

* * * * *